United States Patent
Yoshinaga et al.

(10) Patent No.: US 11,623,289 B2
(45) Date of Patent: Apr. 11, 2023

(54) GEAR MACHINING SUPPORT DEVICE AND GEAR MACHINING DEVICE

(71) Applicant: JTEKT CORPORATION, Osaka (JP)

(72) Inventors: Katsuhito Yoshinaga, Kashihara (JP); Hideki Shibata, Kariya (JP)

(73) Assignee: JTEKT CORPORATION, Kariya (JP)

( * ) Notice: Subject to any disclaimer, the term of this patent is extended or adjusted under 35 U.S.C. 154(b) by 64 days.

(21) Appl. No.: 16/920,797

(22) Filed: Jul. 6, 2020

(65) Prior Publication Data
US 2021/0008653 A1    Jan. 14, 2021

(30) Foreign Application Priority Data

Jul. 8, 2019    (JP) .............................. JP2019-127052
Mar. 30, 2020    (JP) .............................. JP2020-060969

(51) Int. Cl.
*B23F 19/00*    (2006.01)
*B23F 23/12*    (2006.01)
(Continued)

(52) U.S. Cl.
CPC .......... *B23F 19/002* (2013.01); *B23F 23/006* (2013.01); *B23F 23/1218* (2013.01); *B23F 5/06* (2013.01)

(58) Field of Classification Search
CPC ..... B23F 23/1218; B23F 19/002; B23F 17/00
See application file for complete search history.

(56) References Cited

U.S. PATENT DOCUMENTS

| 4,631,870 A * | 12/1986 | Sun ..................... B23F 23/1225 451/21 |
| 5,765,974 A * | 6/1998 | Faulstich ................ B23F 17/00 409/38 |

(Continued)

FOREIGN PATENT DOCUMENTS

| JP | 05-274027 A | 10/1993 |
| JP | 08-197332 A | 8/1996 |

(Continued)

OTHER PUBLICATIONS

JP-2016083746-A machine translation (Year: 2016).*

*Primary Examiner* — Michael W Hotchkiss
(74) *Attorney, Agent, or Firm* — Oblon, McClelland, Maier & Neustadt, L.L.P.

(57) ABSTRACT

A gear machining support device supports machining when a tooth of a gear is machined on a workpiece by relatively moving the workpiece and a machining tool while synchronizing rotations of the workpiece and the machining tool around respective center axis lines thereof. The gear machining support device includes: a target modification amount storage unit configured to store target modification amounts of at least two of modification elements of a tooth surface shape of the tooth of the gear, the modification elements including crowning, bias, a helix angle, a pressure angle, and a tooth profile roundness; and a correction amount determination unit configured to determine a correction amount of a machining control element during a machining operation such that the at least two of modification elements approximate the respective target modification amounts stored in the target modification amount storage unit.

11 Claims, 15 Drawing Sheets

(51) Int. Cl.
    *B23F 23/00*     (2006.01)
    *B23F 5/06*     (2006.01)

(56) References Cited

U.S. PATENT DOCUMENTS

| | | | |
|---|---|---|---|
| 10,569,349 B2* | 2/2020 | Wuerfel | B23F 23/006 |
| 2005/0159938 A1* | 7/2005 | Shigemi | G05B 19/186 |
| | | | 703/7 |
| 2008/0292420 A1* | 11/2008 | Faulstich | B23F 19/002 |
| | | | 409/32 |
| 2010/0242283 A1* | 9/2010 | Thompson | B23F 19/06 |
| | | | 29/893.3 |
| 2011/0250029 A1* | 10/2011 | Faulstich | B23F 21/18 |
| | | | 409/10 |
| 2016/0214197 A1* | 7/2016 | Wuerfel | B23F 5/04 |
| 2017/0235283 A1* | 8/2017 | Saito | B23F 21/00 |
| | | | 700/98 |
| 2018/0126472 A1* | 5/2018 | Zhang | B23F 5/166 |
| 2018/0161896 A1* | 6/2018 | Wuerfel | G05B 19/29 |
| 2019/0391555 A1* | 12/2019 | Vogel | B25J 11/0055 |
| 2020/0094334 A1* | 3/2020 | Herzhoff | B23F 17/001 |
| 2020/0332877 A1* | 10/2020 | Landvogt | B23F 1/02 |

FOREIGN PATENT DOCUMENTS

| | | | | |
|---|---|---|---|---|
| JP | 2012-152837 A | | 8/2012 | |
| JP | 2016083746 A | * | 5/2016 | |
| JP | 2017-144502 A | | 8/2017 | |
| WO | WO-2013076030 A1 | * | 5/2013 | B23F 5/163 |

* cited by examiner

GEAR MACHINING SUPPORT DEVICE AND GEAR MACHINING DEVICE

CROSS-REFERENCE TO RELATED APPLICATIONS

This application is based upon and claims the benefit of priority from Japanese Patent Application No. 2019-127052, filed on Jul. 8, 2019 and Japanese Patent Application No. 2020-060969, filed on Mar. 30, 2020, the entire contents of which are incorporated herein by reference.

FIELD

The present disclosure relates to a gear machining support device and a gear machining device.

BACKGROUND

When a gear is subjected to a load, a meshing state of the gear may deteriorate due to deformation of a tooth or a shaft, and a noise may be generated. There is an increasing demand for the gear to have ideal meshing under load to improve quietness, and it is necessary to modify a tooth surface shape of the tooth. Modification elements of the tooth surface shape of the tooth of the gear include, for example, crowning, bias, a helix angle, a pressure angle, and a tooth profile roundness (see JP-A-2012-152837, JP-A-H5-274027, and JP-A-H8-197332).

SUMMARY

In the modification of the tooth surface shape of the tooth of the gear, when a distance between centers of a center axis line of a machining tool and a center axis line of a workpiece is changed to modify the crowning, the bias is also modified at the same time. A modification amount of the crowning and a modification amount of the bias are in a proportional relation, and when the modification amount of the crowning is determined, the modification amount of the bias is also determined. Therefore, it is difficult to approximate a plurality of modification elements to target modification amounts, and there is a problem that a degree of freedom in a design of the tooth surface shape is significantly reduced. Accordingly, under the present circumstances, a tooth of a gear having the modified tooth surface shape is machined after the tooth surface shape is modified by trial and error, which causes a problem that machining time is required.

An object of the present disclosure is to provide a gear machining support device capable of approximating a plurality of modification elements of a tooth surface shape of a tooth of a gear to target modification amounts, and a gear machining device capable of machining the tooth of the gear having the tooth surface shape whose modification elements approximate to the target modification amounts.

(Gear Machining Support Device)
In an aspect of the present disclosure, there is provided a gear machining support device that supports machining when a tooth of a gear is machined on a workpiece by relatively moving the workpiece and a machining tool while synchronizing a rotation of the workpiece around a center axis line of the workpiece and a rotation of the machining tool around a center axis line of the machining tool, the gear machining support device including: a target modification amount storage unit configured to store target modification amounts of at least two of modification elements of a tooth surface shape of the tooth of the gear, the modification elements including crowning, bias, a helix angle, a pressure angle, and a tooth profile roundness; and a correction amount determination unit configured to determine a correction amount of a machining control element during a machining operation such that the at least two of modification elements approximate the respective target modification amounts stored in the target modification amount storage unit.

The modification element of the tooth surface shape of the tooth of the gear changes by changing the machining control element during the operation of machining the tooth of gear on the workpiece. Therefore, the correction amount of the machining control element can be determined so as to approximate the plurality of modification elements to the target modification amounts, and a degree of freedom in a design of the tooth surface shape can be increased.

(Gear Machining Device) In another aspect of the present disclosure, there is provided a gear machining device includes the gear machining support device, and the machining control unit configured to control machining of the tooth of the gear based on the correction amount of the machining control element determined by the correction amount determination unit. Machining time (machining study time) of the tooth of the gear having the modified tooth surface shape can be shortened by machining the tooth of the gear on the workpiece based on the determined correction amount of the machining control element.

DETAILED DESCRIPTION (1. Configuration of Gear Machining Device 10)

Figure 1:
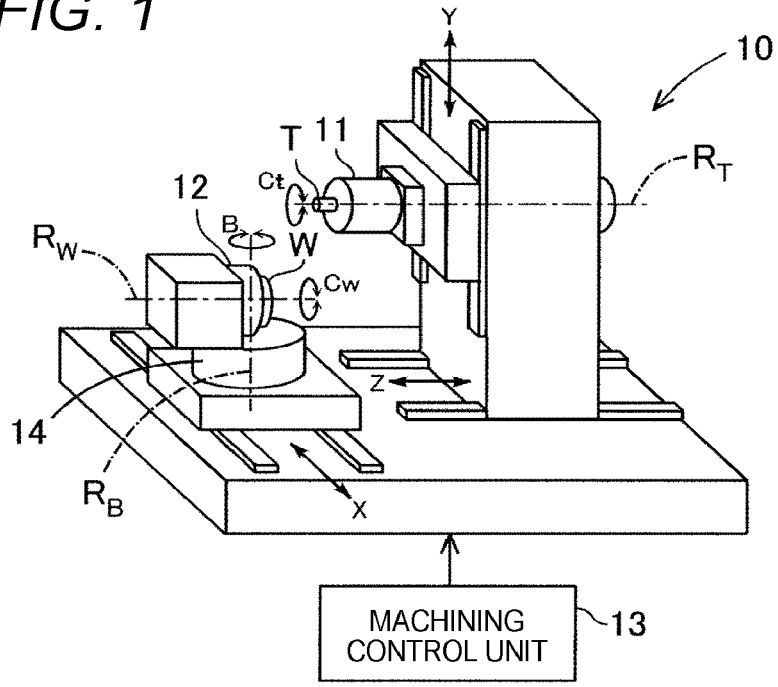
FIG. 1 is a view showing a configuration of a gear machining device.

A configuration of a gear machining device will be described with reference to FIG. 1. As shown in FIG. 1, a gear machining device 10 is, for example, a five-axis machining center having three linear axes and two rotation axes as drive axes for changing relative positions and postures of a workpiece W and a machining tool T. In the present embodiment, the gear machining device 10 includes orthogonal three axes (X axis, Y axis, and Z axis) as the linear axes, and a B axis and a Cw axis as the rotation axes. In the present embodiment, the B axis is a rotation axis around a center axis line RB of a rotary table 14 parallel to the Y axis, and the Cw axis is a rotation axis around a center axis line $R_W$ of the workpiece W. The gear machining device 10 has a Ct axis, which is a rotation axis around a center axis line $R_T$ of the machining tool T, and is a six-axis machining center when the Ct axis is included.

The gear machining device 10 includes a tool spindle 11 that supports the machining tool T, is rotatable about the Ct axis, and is movable in a Y-axis direction and a Z-axis direction, respectively. Further, the gear machining device 10 includes a workpiece spindle 12 that supports workpiece W, is rotatable about the Cw axis, rotatable about the B axis, and movable in an X-axis direction. The gear machining device 10 includes a machining control unit 13 or the like for controlling an operation of machining a tooth of a gear. In the present embodiment, a case will be described in which the machining control unit 13 controls the machining of the tooth of the gear on the workpiece W by skiving process. However, the present invention is also applicable to gear grinding with a threaded grinding wheel and gear cutting with hobbing. Incidentally, the tool spindle 11 and the workpiece spindle 12 are not limited to the above configuration, and may be configured to be movable relative to each other.

(2. Skiving Process)

Figure 2A:
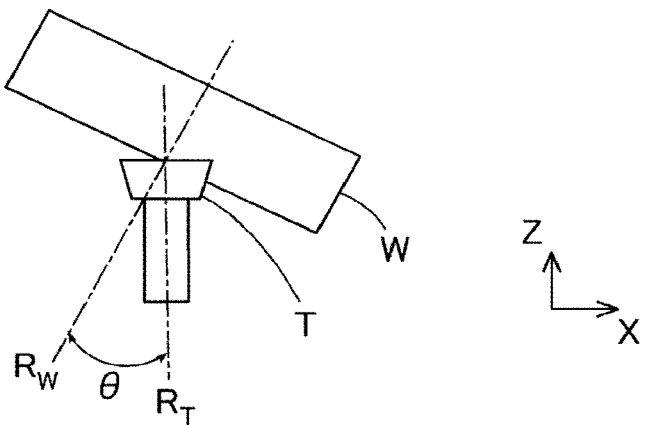
FIG. 2A is a view of a workpiece and a machining tool in a gear skiving process when an intersection angle is set, as viewed in a radial direction of the machining tool.
Figure 2B:
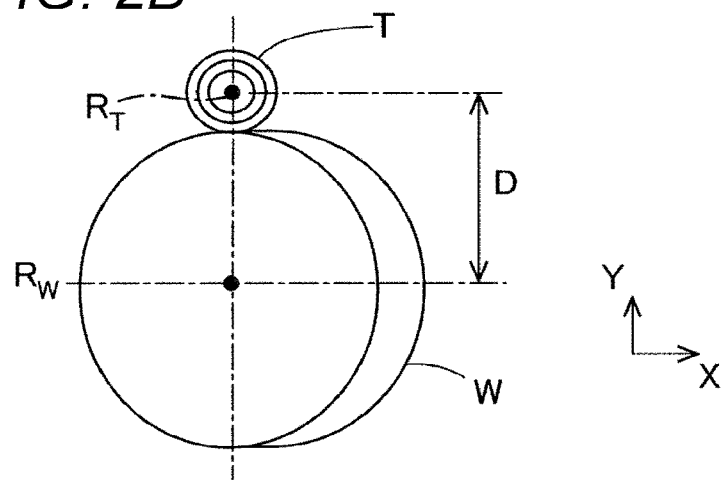
FIG. 2B is a view of FIG. 2A as viewed in a center axis line direction of the machining tool.

The skiving process will be described with reference to FIGS. 2A, 2B, 3A, and 3B. In the skiving process, as shown in FIGS. 2A and 2B, the center axis line $R_T$ of the machining tool T is set to a state having an intersection angle θ with respect to an axis parallel to the center axis line $R_W$ of the workpiece W. In addition, when viewed in the X-axis direction, the center axis line $R_T$ of the machining tool T and the center axis line $R_W$ of the workpiece W are parallel to each other. A distance between centers of the center axis line $R_T$ of the machining tool T and the center axis line $R_W$ of the workpiece W is set to D (a center distance).

Figure 3A:
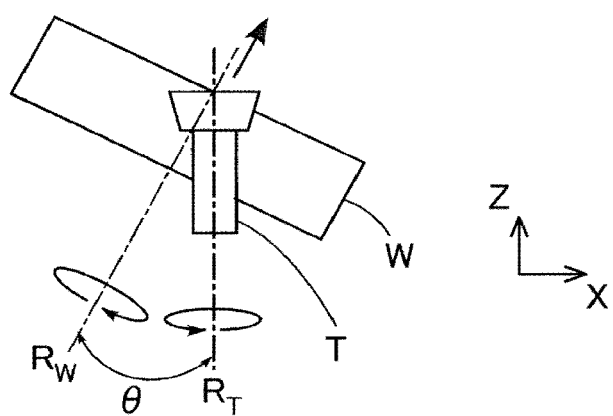
FIG. 3A is a view for explaining an operation of the gear skiving process as viewed in the radial direction of the machining tool.
Figure 3B:
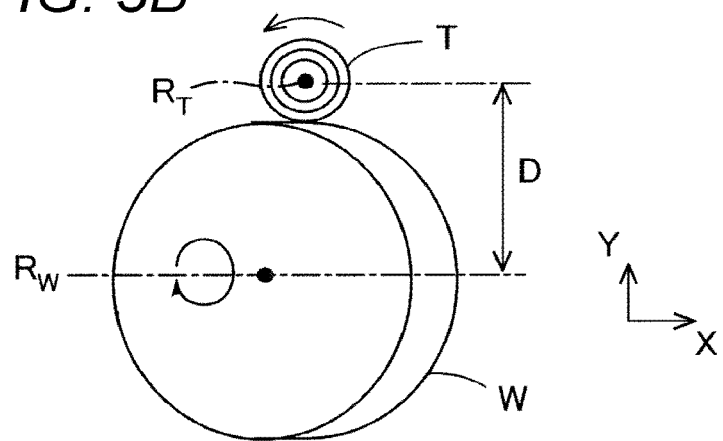
FIG. 3B is a view of FIG. 3A as viewed in the center axis line direction of the machining tool.

As shown in FIGS. 3A and 3B, the machining tool T is moved to the workpiece W in a direction of the center axis line $R_W$ of the workpiece W while synchronizing a rotation of the workpiece W around the center axis line $R_W$ of the workpiece W and a rotation of the machining tool T around the center axis line $R_T$ of the machining tool T, thereby machining the tooth of the gear on the workpiece W. In the skiving process, each tooth groove portion of the workpiece W is machined only once by the machining tool T while the workpiece W is rotated one revolution.

(3. Tooth Surface Modification Element)

A tooth surface modification element in a case of modifying a tooth surface shape of the gear will be described with reference to FIGS. 4A to 4E. As shown in FIGS. 4A to 4E, the modification elements for modifying a shape of a tooth surface Gf of a tooth G of the gear include crowning (FIG. 4A), bias (FIG. 4B), a helix angle (FIG. 4C), a pressure angle (FIG. 4D) and a tooth profile roundness (FIG. 4E). Here, the term "crowning" means that a center portion of a tooth width is higher than both end portions thereof in a tooth lead direction. The bias is to continuously change the pressure angle in the tooth lead direction and give a twist to the tooth surface.

Figure 4A:
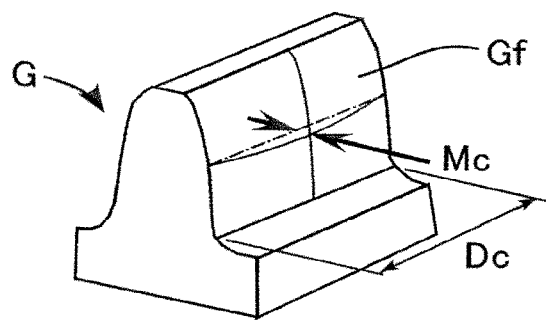
FIG. 4A is a view showing a modification amount of crowning as a modification element.
Figure 4B:
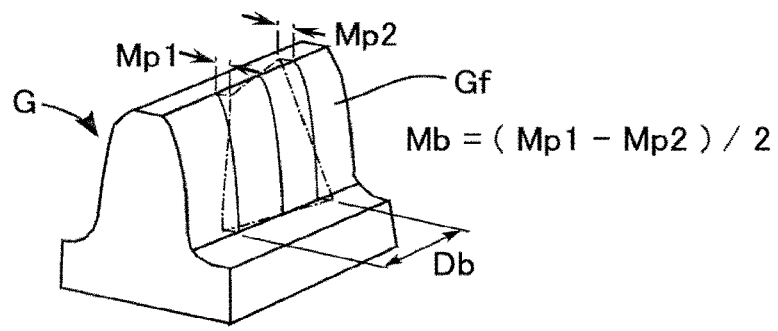
FIG. 4B is a view showing a modification amount of bias as a modification element.

As shown in FIG. 4A, a modification amount Mc of the crowning is represented by a distance at a portion on the tooth surface Gf of the tooth G through which a reference circle passes at a center position (in the present embodiment, a tooth width center position) of an evaluation range Dc in the tooth lead direction. As shown in FIG. 4B, a modification amount Mb of the bias is represented by a half angle of a difference between pressure angles Mp1, Mp2 at both end positions (in the present embodiment, Db/2 positions on both sides from the tooth width center position) in the tooth surface Gf of the tooth G in an evaluation range Db in the tooth lead direction.

Figure 4C:
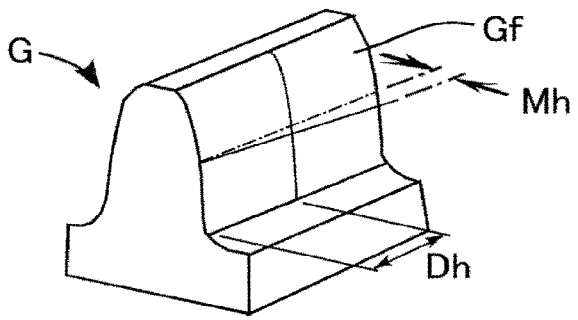
FIG. 4C is a view showing a modification amount of a helix angle as a modification element.
Figure 4D:
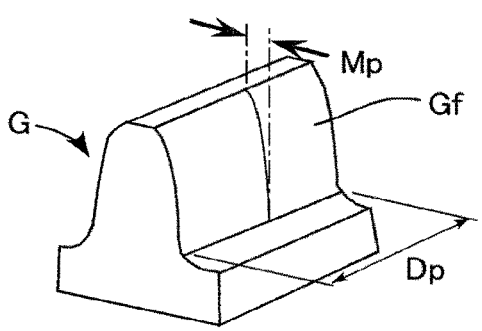
FIG. 4D is a view showing a modification amount of a pressure angle as a modification element.
Figure 4E:
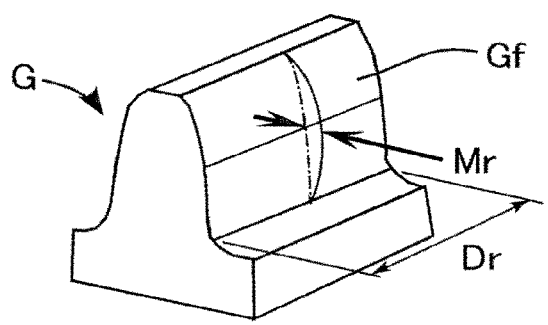
FIG. 4E is a view showing a modification amount of a tooth profile roundness as a modification element.

As shown in FIG. 4C, a modification amount Mh of the helix angle is represented by an angle in the tooth lead direction at a portion on the tooth surface Gf of the tooth G through which the reference circle passes at both end positions (in the present embodiment, a position of one end surface of the tooth and the tooth width center position) of an evaluation range Dh in the tooth lead direction. As shown in FIG. 4D, a modification amount Mp of the pressure angle is represented by an angle in a tooth depth direction at a center position (in the present embodiment, the tooth width center position) of an evaluation range Dp in the tooth lead direction in the tooth surface Gf of the tooth G. As shown in FIG. 4E, a modification amount Mr of the tooth profile roundness is represented by a distance at a portion on the tooth surface Gf of the tooth G through which the reference circle passes at a center position (in the present embodiment, the tooth width center position) of an evaluation range Dr in a tooth lead direction.

(4. Basics of Tooth Surface Modification Method)

Among the modification elements of the tooth surface shape, the modification of the pressure angle and the tooth profile roundness is performed in a tooth profile direction, and transfer of a tool shape. That is, it is possible to perform the modification with tool specifications such as a blade shape, the number of blades, an addendum modification coefficient, the helix angle (the intersection angle), a blade applying angle, and a rake angle of the machining tool T. On the other hand, the modification of the crowning, the bias, and the helix angle is performed in the tooth width direction, and is transfer of a motion trajectory of the gear machining device 10. That is, it is possible to perform the modification in the Cw axis, the B axis, the X axis, and the Y axis that are machining control elements of the gear machining device 10. Incidentally, the pressure angle and the tooth profile roundness can also be modified by the machining control element of the gear machining device 10, but in the present embodiment, the modification is performed based on a tool blade shape (specifications) of the machining tool T.

Figure 5A:
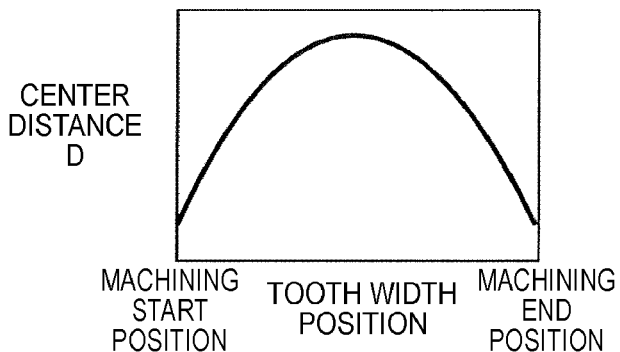
FIG. 5A is a view showing a motion of parabolicly changing a distance between centers of a center axis line of the machining tool and a center axis line of the workpiece.

Specifically, as shown in FIG. 5A, the crowning can be formed by a motion of parabolicly changing the distance D (as shown in FIGS. 2B and 3B) between the centers of the center axis line $R_T$ of the machining tool T and the center axis line $R_W$ of the workpiece W in the tooth width direction. Therefore, the crowning can be modified by controlling an operation of the gear machining device 10 in the Y axis.

Figure 5B:
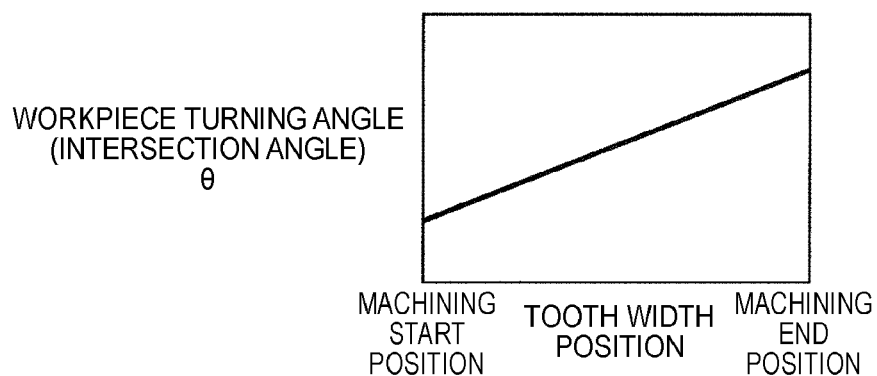
FIG. 5B is a view showing a motion of linearly changing an intersection angle between the center axis line of the machining tool and the center axis line of the workpiece.

As shown in FIG. 5B, the bias can be formed by a motion of linearly changing the intersection angle θ formed between the center axis line $R_T$ of the machining tool T and the center axis line $R_W$ of the workpiece W in the tooth width direction. Therefore, the bias can be modified by controlling an operation of rotating the machining tool T around an axis line parallel to the Y axis. However, since the machining tool T does not rotate in the gear machining device 10, the bias can be modified by controlling an operation (a workpiece turning angle (the intersection angle θ)) in the B axis that is the rotation axis of the workpiece W. Here, a machining point P is a point at which a blade tip circle of the machining tool T and a root circle of the workpiece W are in contact with each other.

Although not shown, since the bias can be formed by changing an offset angle in the tooth width direction in response to shift of the machining point of the machining tool T and the workpiece W in a circumferential direction of the workpiece W, the bias can be modified by controlling an operation of the gear machining device 10 in the X axis and the Y axis.

Figure 5C:
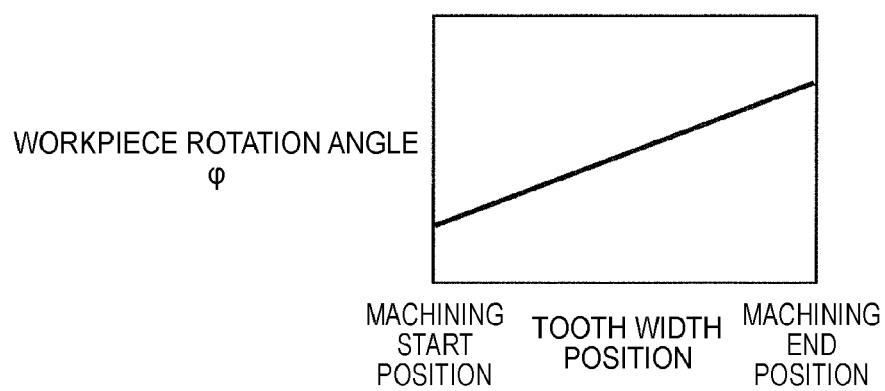
FIG. 5C is a view showing a motion of linearly changing a rotation angle of the workpiece with respect to a rotation angle of the machining tool.

As shown in FIG. 5C, the helix angle can be formed by a motion of linearly changing a rotation angle φ of the workpiece W with respect to a rotation angle of the machining tool T in the tooth width direction. Therefore, the helix angle can be modified by controlling an operation of the gear machining device 10 in the Cw axis. Incidentally, horizontal axes in FIGS. 5A to 5C each indicates a tooth width position of the machining point of the machining tool T and the workpiece W, that is, from a position (a machining start position) of a right tooth surface on one end surface side of the tooth to a position (a machining end position) of the right tooth surface on another end surface side of the tooth.

(5. Correlation of Modification Element and Machining Control Element)

Next, a correlation between each modification element and each machining control element will be described with reference to FIGS. 6A to 6D. Here, the correlation between each modification element and each machining control element varies depending on the specifications of the machining tool T. Further, the specifications of the machining tool T are determined based on specifications of the gear to be machined on the workpiece W. Therefore, the correlations shown in FIGS. 6A to 6D represent correlations in certain machining tools T, and different correlations are shown if the machining tools T are different. In addition, the modification element exemplifies the crowning, the bias, and the helix angle, and the machining control element exemplifies the Y axis, the B axis, the Cw axis, and the offset angle (two synchronous axes of the X axis and Y axis).

Figure 6A:
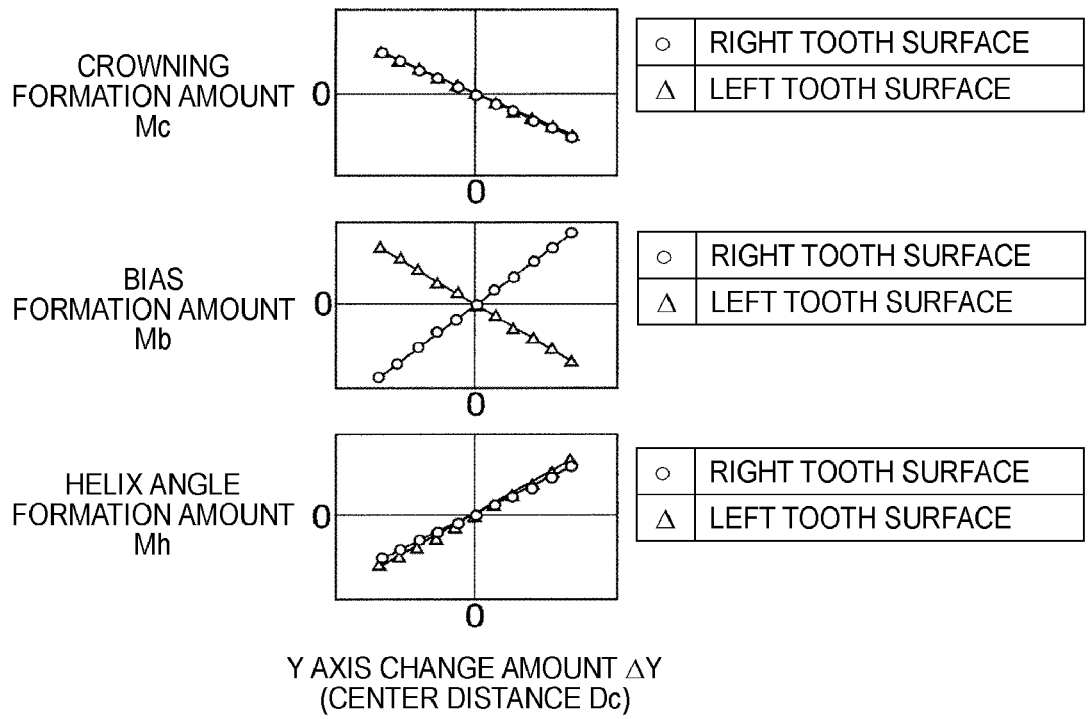
FIG. 6A is a graph showing a correlation between a change amount in a Y axis and a formation amount of the crowning, a correlation between the change amount in the Y axis and a formation amount of the bias, and a correlation between the change amount in the Y axis and a formation amount of the helix angle.

FIG. 6A shows a correlation between a change amount ΔY in the Y axis and a formation amount Mc of the crowning, a correlation between the change amount ΔY in the Y axis and a formation amount Mb of the bias, and a correlation between the change amount ΔY in the Y axis and a formation amount Mh of the helix angle. Each correlation is calculated based on an error between the tooth surface shape of the gear obtained by a gear machining simulation and a reference tooth surface shape in a case where the gear machining simulation is performed in a state in which only the Y axis is changed from a reference machining control element.

For example, as each correlation, the correlation between the modification element and the machining control element is calculated by, for example, a quadratic function based on the tooth surface shape of the gear obtained by the gear machining simulation. Specifically, an error between the tooth surface shape of the gear obtained by the gear machining simulation and a tooth surface of an involute helicoid, which is a reference tooth surface shape, is calculated, and a correlation between the calculated error and the change amount of the machining control element (the Y axis) is calculated.

Specifically, first, a plurality of tooth surface shapes are calculated by gradually changing the Y axis, which is a machining control element by the gear machining simulation. This process is sequentially performed to calculate the overall shape of the tooth surface. Then, for the correlation, the respective formation amounts Mc, Mb, and Mh of the crowning, the bias, and the helix angle that are the modification elements of the tooth surface shape are calculated, and a graph is created by associating the calculated formation amounts Mc, Mb, and Mh of the crowning, the bias, and the helix angle with the change amount ΔY in the Y axis, which is the machining control element.

The change amount ΔY in the Y axis includes a value obtained by making a plurality of changes in a positive direction from a reference value and a value obtained by making a plurality of changes in a negative direction from the reference value. As shown in FIG. 6A, in response to change of the Y axis, the crowning can be greatly changed. However, in response to change of the Y axis, the bias and the helix angle also change.

Here, the gear machining simulation is described in, for example, JP-A-2017-144502. The reference machining control element is a machining control element for machining a gear to which the crowning, the bias, a modified helix angle, the pressure angle, and the tooth profile roundness are provided. Incidentally, the modified helix angle means a helix angle with respect to a reference helix angle that is the specifications of the gear.

Figure 6B:
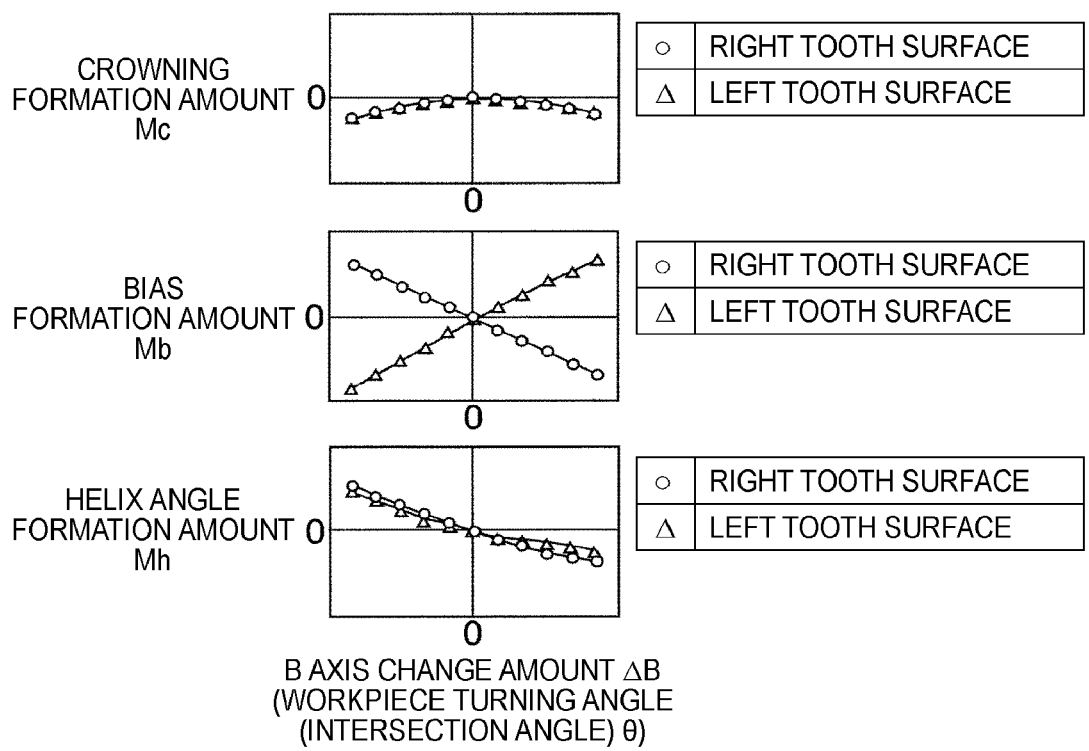
FIG. 6B is a graph showing a correlation between a change amount in a B axis and the formation amount of the crowning, a correlation between the change amount in the B axis and the formation amount of the bias, and a correlation between the change amount in the B axis and the formation amount of the helix angle.

FIG. 6B shows a correlation between a change amount ΔB in the B axis and the formation amount Mc of the crowning, a correlation between the change amount ΔB in the B axis and the formation amount Mb of the bias, and the change amount ΔB in the B axis and the formation amount Mh of the helix angle. Each correlation is calculated based on an error between the tooth surface shape of the gear obtained by the gear machining simulation and the reference tooth surface shape in a case where the gear machining simulation is performed in a state in which only the B axis is changed from the reference machining control element.

A graph in which the respective formation amounts Mc, Mb, and Mh of the crowning, the bias, and the helix angle are associated with the change amount ΔB in the B axis, which is the machining control element, is substantially created in the same manner as the Y axis described above. The change amount ΔB in the B axis includes a value obtained by making a plurality of changes in a positive direction from a reference value and a value obtained by making a plurality of changes in a negative direction from the reference value. As shown in FIG. 6B, in response to change of the B axis, the bias can be greatly changed. However, in response to change of the B axis, the crowning and the helix angle slightly change.

Figure 6C:
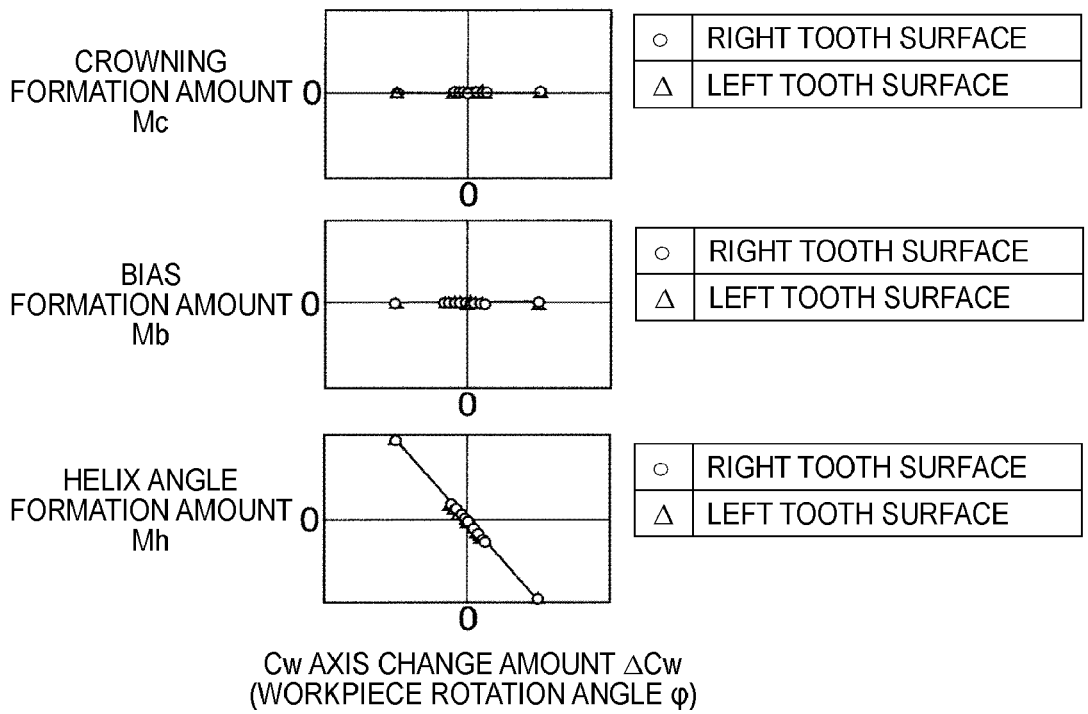
FIG. 6C is a graph showing a correlation between a change amount in a Cw axis and the formation amount of the crowning, a correlation between the change amount in the Cw axis and a formation amount of the bias, and a correlation between the change amount in the Cw axis and the formation amount of the helix angle.

FIG. 6C shows a correlation between a change amount ΔCw in the Cw axis and the formation amount Mc of the crowning, a correlation between the change amount ΔCw in the Cw axis and the formation amount Mb of the bias, and the change amount ΔCw in the Cw axis and the formation amount Mh of the helix angle. Each correlation is calculated based on an error between the tooth surface shape of the gear obtained by the gear machining simulation and the reference tooth surface shape in a case where the gear machining simulation is performed in a state in which only the Cw axis is changed from the reference machining control element.

A graph in which the respective formation amounts Mc, Mb, and Mh of the crowning, the bias, and the helix angle are associated with the change amount ΔCw in the Cw axis, which is the machining control element, is substantially created in the same manner as the Y axis described above. The change amount ΔCw in the Cw axis includes a value obtained by making a plurality of changes in a positive direction from a reference value and a value obtained by making a plurality of changes in a negative direction from the reference value. As shown in FIG. 6C, in response to change of the Cw axis, the helix angle can be greatly changed. Incidentally, in response to change of the Cw axis, the crowning and the bias hardly change.

Figure 6D:
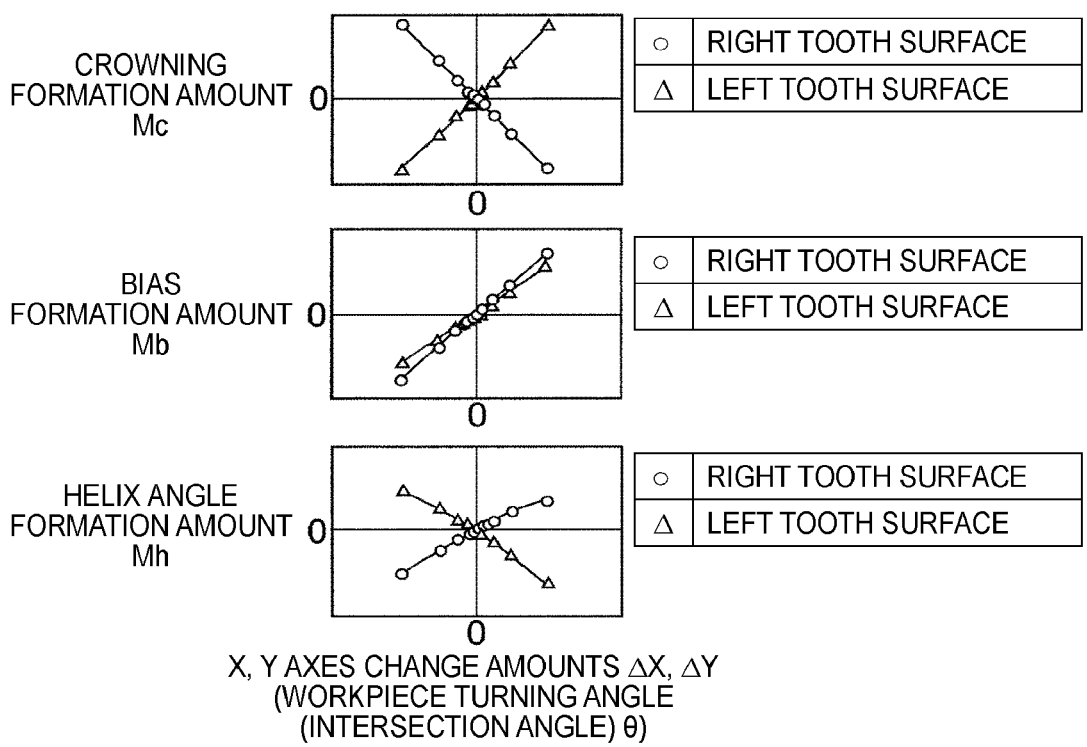
FIG. 6D is a graph showing a correlation between change amounts in X and Y axes and the formation amount of the crowning, a correlation between the change amounts in the X and Y axes and the formation amount of the bias, and a correlation between the change amounts in the X and Y axes and the formation amount of the helix angle.

FIG. 6D shows a correlation between a change amount of the offset angle and each modification element. Here, the offset angle is an angle in response to change of shift of the machining point of the machining tool T and the workpiece W in the circumferential direction of the workpiece W. Therefore, the offset angle can be represented by synchronizing the X axis and the Y axis. That is, the change amount in the offset angle can be represented by the change amounts ΔX, ΔY due to the two synchronous axes of the X axis and the Y axis. Hereinafter, the change amount in the offset angle is represented as ΔX, ΔY.

That is, FIG. 6D shows a correlation between change amounts ΔX, ΔY of the offset angle and the formation amount Mc of the crowning, a correlation between the change amounts ΔX, ΔY of the offset angle and the formation amount Mb of the bias, a correlation between the change amounts ΔX, ΔY of the offset angle and the formation amount Mh of the helix angle. Each correlation is calculated based on an error between the tooth surface shape of the gear obtained by the gear machining simulation and the reference tooth surface shape in a case where the gear machining simulation is performed in a state in which only the offset angle is changed from the reference machining control element.

A graph in which the respective formation amounts Mc, Mb, and Mh of the crowning, the bias, and the helix angle are associated with the change amounts ΔX, ΔY in the offset angle, which is the machining control element, is substantially created in the same manner as the Y axis described above. As shown in FIG. 6D, in response to change of the offset angle, the bias can be greatly changed. However, in response to change of the offset angle, the crowning and the helix angle also change.

As described above, each modification element and each machining control element are mutually affected. Therefore, even when one modification element is modified, since another modification element is affected, the modification of the other modification element is necessary. In the above description, each of the machining control elements (the Y axis, the B axis, the Cw axis, and the offset angle) is changed individually, but a plurality of elements may be synchronously changed based on a specified synchronization condition. Also in this case, the correlation between the machining control element and the modification element can be obtained.

(6. Method for Calculating Error with Reference Tooth Surface)

As described above, each correlation is calculated based on the error between the tooth surface shape of the gear and the reference tooth surface shape in response to change of each machining control element. Further, the reference tooth surface shape is, for example, an involute tooth surface.

Figure 7:
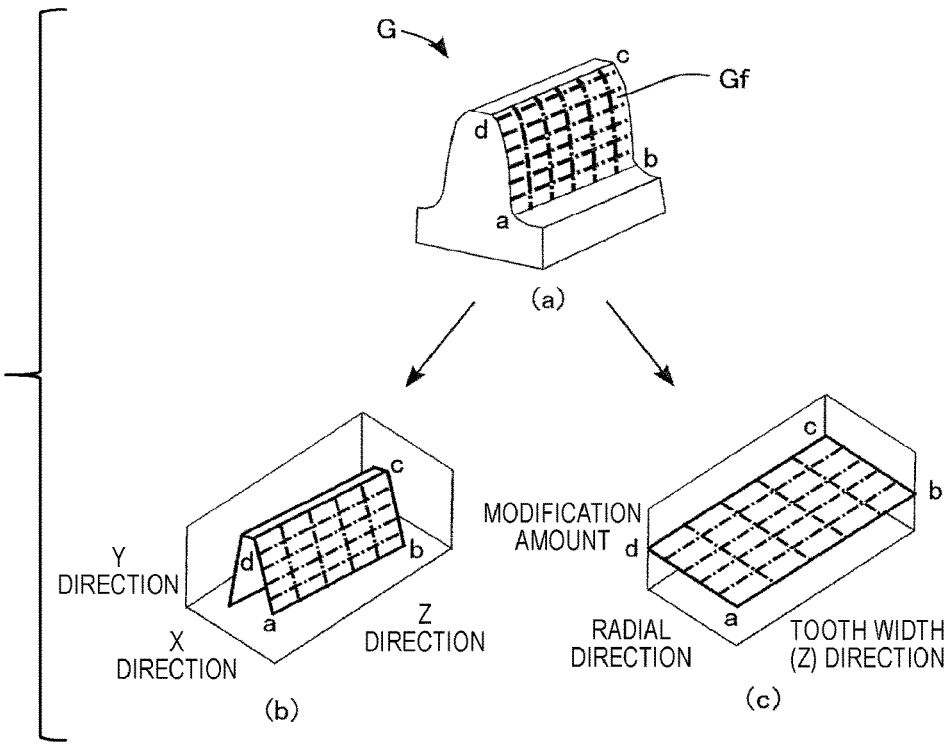
FIG. 7 is a view showing a case where an involute tooth surface is shown on an orthogonal coordinate system (X direction-Y direction-Z direction) and a case where the involute tooth surface is replaced by a plane coordinate system in a radial direction and a tooth width (Z) direction and an error is shown on a vertical axis.

Here, characteristics in a case where the tooth surface Gf of the tooth G of the gear shown in Section (a) of FIG. 7 is an involute tooth surface abcd are difficult to grasp by calculation on the orthogonal coordinate system (X direction-Y direction-Z direction) shown in Section (b) of FIG. 7 by the gear machining simulation. Therefore, the involute tooth surface abcd can be easily grasped by improving and calculating the gear machining simulation.

That is, as shown in Section (c) of FIG. 7, the involute tooth surface abcd is replaced with a plane abcd in a plane coordinate system in a radial direction and the tooth width (Z) direction. A vertical axis represents an error with the replaced plane abcd (the formation amounts Mc, Mb, and Mh of the crowning, the bias, and the helix angle). Incidentally, instead of the replacement with the plane abcd, only an acting line may be replaced.

(7. Configuration of Gear Machining Support Device 20)

A configuration of the gear machining support device 20 will be described with reference to FIGS. 8 and 9. The gear machining support device 20 is a device capable of supporting when the tooth surface shape is modified and the tooth of gear is machined. The modification elements of the tooth surface shape include the crowning (FIG. 4A), the bias (FIG. 4B), the helix angle (FIG. 4C), the pressure angle (FIG. 4D), and the tooth profile roundness (FIG. 4E) as described above. However, the gear machining device 10 targets at least two of the modification elements.

Figure 8:
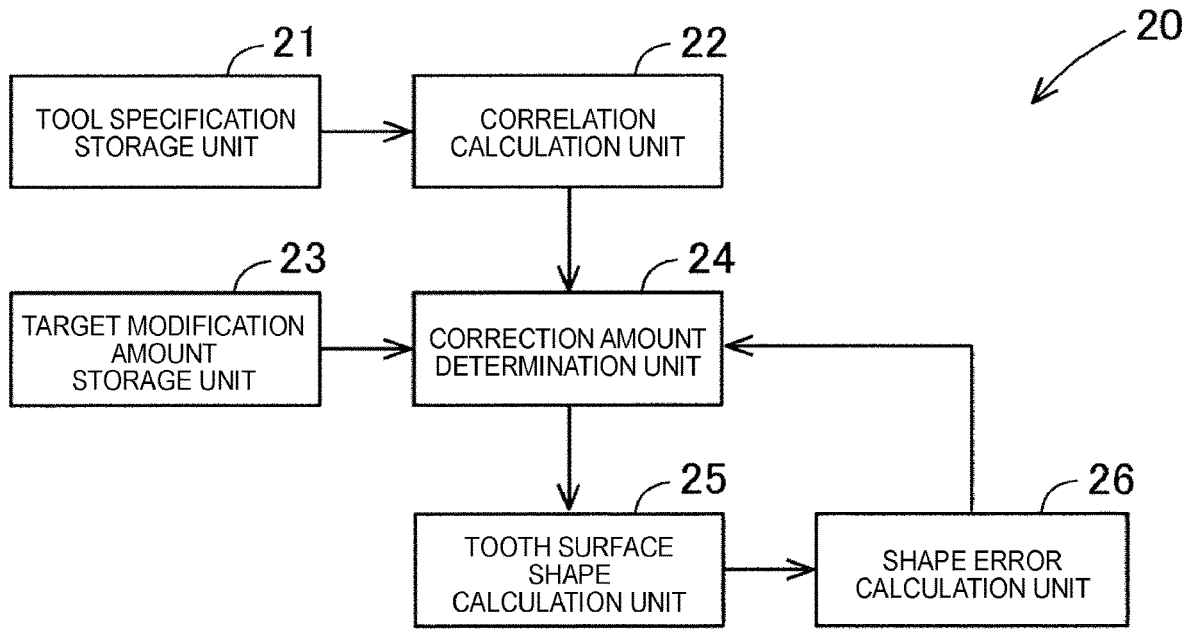
FIG. 8 is a view showing a configuration of a gear machining support device.
Figure 9:
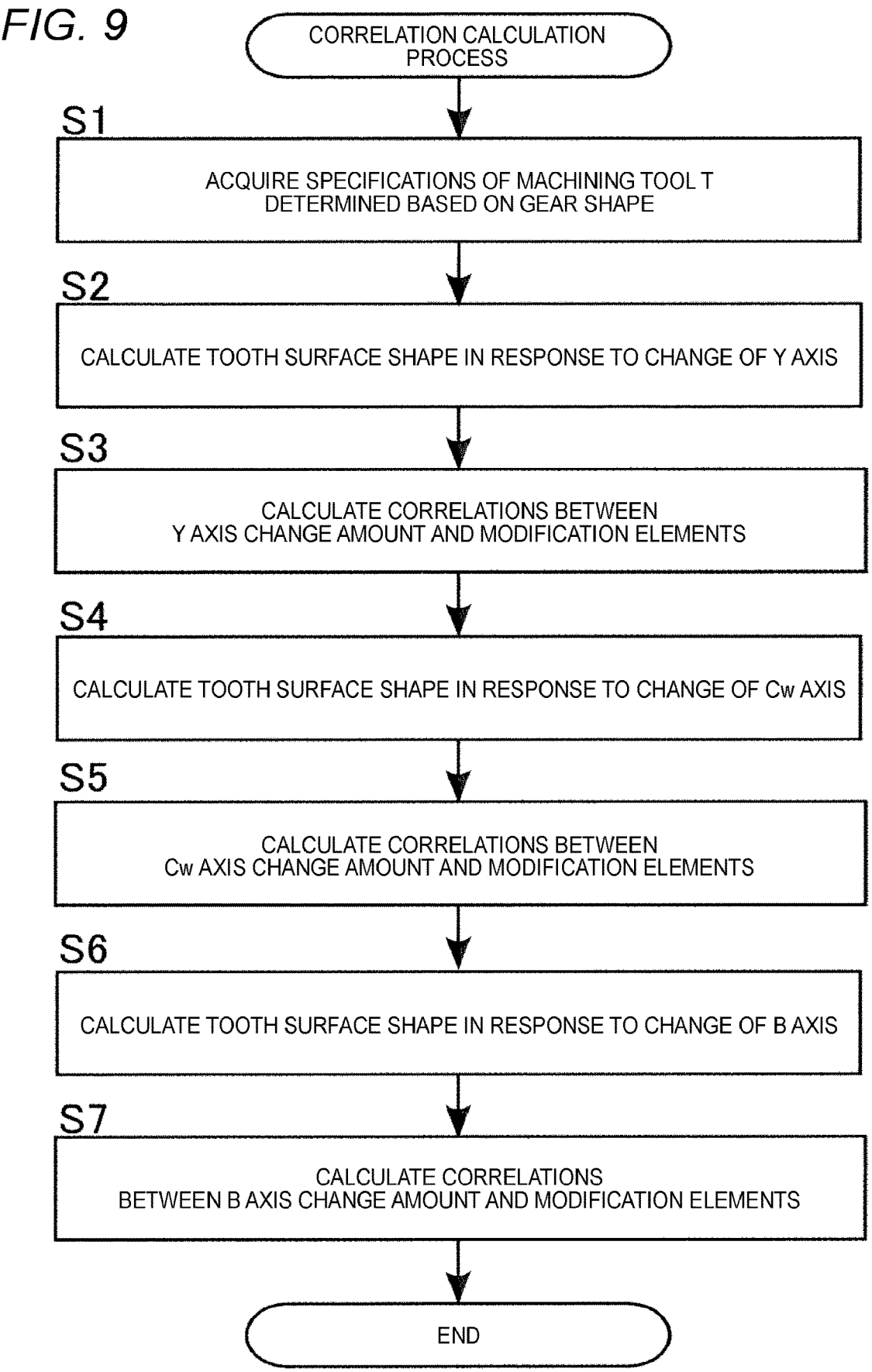
FIG. 9 is a flowchart showing a process performed by a correlation calculation unit included in the gear machining support device.

As shown in FIG. 8, the gear machining support device 20 includes a tool specification storage unit 21, a correlation calculation unit 22, a target modification amount storage unit 23, a correction amount determination unit 24, a tooth surface shape calculation unit 25, a shape error calculation unit 26, or the like. The tool specifications are stored in the tool specification storage unit 21. The tool specifications are determined based on the specifications of the gear to be machined on the workpiece W. The gear machining support device 20 may be, for example, an embedded system (microcomputer) such as a programmable logic controller (PLC) or a computerized numerical control (CNC) device, or may be a personal computer, a server, or the like.

The correlation calculation unit 22 calculates the correlation between the modification element (the crowning, the bias, the helix angle, the pressure angle and the tooth profile roundness) and the machining control element (the Y axis, the B axis, and the Cw axis). Incidentally, the machining control element may be an offset angle instead of the B axis. The correlations between the modification elements and the machining control elements are as shown in FIGS. 6A to 6D.

However, the correlation between each modification element and each machining control element varies depending on the specifications of the machining tool T. Therefore, the correlation between each modification element and each machining control element is calculated based on the specifications of the machining tool T stored in the tool specification storage unit 21. As described above, each correlation is calculated based on the tooth surface shape of the gear in response to change of a predetermined machining control element using the gear machining simulation.

An example of a process by the correlation calculation unit 22 will be described with reference to FIG. 9. First, the specifications of the machining tool T determined based on a gear shape are acquired from the tool specification storage unit 21 (step S1). Next, by the gear machining simulation, a plurality of tooth surface shapes are calculated in response to change of the Y axis, which serves as one of the machining control elements (step S2). Next, the correlation between the change amount $\Delta Y$ in the Y axis and each modification element is calculated based on the error between the tooth surface shape of the gear calculated by the gear machining simulation and the reference tooth surface shape (step S3).

Next, by the gear machining simulation, a plurality of tooth surface shapes are calculated in response to change of the Cw axis, which serves as one of the machining control elements (step S4). Next, the correlation between the change amount $\Delta Cw$ in the Cw axis and each modification element is calculated based on the error between the tooth surface shape of the gear calculated by the gear machining simulation and the reference tooth surface shape (step S5).

Next, by the gear machining simulation, a plurality of tooth surface shapes are calculated in response to change of the B axis, which serves as one of the machining control elements (step S6). Next, the correlation between the change amount $\Delta B$ in the B axis and each modification element is calculated based on the error between the tooth surface shape of the gear calculated by the gear machining simulation and the reference tooth surface shape (step S7). An order of calculating the correlations in the Y axis, the Cw axis, and the B axis may be changed as appropriate.

The target modification amount storage unit 23 stores target modification amount of the crowning, the bias, and the helix angle, which are the modification elements of the tooth surface shape of the tooth of the gear. Incidentally, in a case where the pressure angle and the tooth profile roundness are modified by the machining control element of the gear machining device 10, target modification amounts of the pressure angle and the tooth profile roundness are also stored in the target modification amount storage unit 23.

The correction amount determination unit 24 determines correction amounts $\Delta Ya$, $\Delta Ba$, and $\Delta Cwa$ in the Y axis, the B axis, and the Cw axis that are the machining control elements during a machining operation such that the crowning, the bias, and the helix angle, which are the modification elements, become the target modification amounts stored in the target modification amount storage unit 23. Incidentally, instead of the correction amount $\Delta Ba$ in the B axis, a correction amount of the offset angle can also be used. Further, the correction amount determination unit 24 supports the machining control by the machining control unit 13 based on the determined correction amounts $\Delta Ya$, $\Delta Ba$, and $\Delta Cwa$ in the Y axis, the B axis (or the offset angle), and the Cw axis, which are the machining control elements.

Here, the modification element of the shape of the tooth surface Gf of the tooth G of the gear changes by changing the machining control element during the operation of machining the tooth G of the gear on the workpiece W. Therefore, it is possible to determine the correction amounts $\Delta Ya$, $\Delta Ba$, and $\Delta Cwa$, which are the machining control elements, so that the modification elements approximate the target modification amounts, and a degree of freedom in a design of the tooth surface shape can be increased.

Since the correction amount determination unit 24 changes the correction amount of the machining control element in order to set the modification element as the target modification amount, all the modification elements may not fall within tolerance values of the target modification amounts. Accordingly, it is acceptable if at least two of the modification elements are within the tolerance values of the target modification amounts. Details of the determination of the correction amount of the machining control element will be described later.

The tooth surface shape calculation unit 25 calculates the tooth surface shape of the gear using the correction amounts $\Delta Ya$, $\Delta Ba$, and $\Delta Cwa$ in the Y axis, the B axis, and the Cw axis, which are the machining control elements, determined by the correction amount determination unit 24. The tooth surface shape of the gear can be calculated by a gear machining simulation process. The gear machining simulation is the same as that used in the process of calculating the correlation described above. Further, the shape error calculation unit 26 calculates each error of the crowning, the bias, and the helix angle by comparing the tooth surface shape calculated by the tooth surface shape calculation unit 25 with the target modification amounts stored in the target modification amount storage unit 23. Thereby, accuracy of the tooth surface shape can be improved.

A correction amount determination process of the modification element performed by the correction amount determination unit 24, the tooth surface shape calculation unit 25, and the shape error calculation unit 26 will be described with reference to FIG. 10. First, the correction amount determination unit 24 acquires the target modification amounts of the crowning, the bias, and the helix angle, which are the modification elements, stored in the target modification amount storage unit 23 (step S11). Further, the correction amount determination unit 24 acquires the correlation calculated by the correlation calculation unit 22. That is, the correction amount determination unit 24 acquires the correlation between each modification element and each machining control element, which is a correlation corresponding to the tool specifications (step S12).

Next, the correction amount determination unit 24 calculates the correction amount $\Delta Ya$ in the Y axis (step S13). For example, the correction amount determination unit 24 calculates the correction amount $\Delta Ya$ in the Y axis based on the target modification amount of the crowning and the correlation between the change amount $\Delta Y$ in the Y axis and the formation amount Mc of the crowning (an upper diagram of FIG. 6A). The change amount $\Delta Y$ in the Y axis in a case in which the formation amount Mc of the crowning in FIG. 6A is the target modification amount is set as the correction amount $\Delta Ya$ in the Y axis.

Next, the correction amount determination unit 24 calculates the correction amount $\Delta Ba$ in the B axis (step S14). For example, the correction amount determination unit 24 calculates the correction amount $\Delta Ba$ in the B axis based on the target modification amount of the bias, the change amount $\Delta B$ in the B axis, the formation amount Mb of the bias (a middle diagram of FIG. 6B) and the formation amount of the bias Mb (a middle diagram of FIG. 6A) at the correction amount $\Delta Ya$ in the Y axis. For example, in a case where the sum of the formation amount Mb of the bias at the correction amount $\Delta Ya$ in the Y axis (the middle diagram of FIG. 6A) and the formation amount Mb of the bias in FIG. 6B matches the target modification amount, the formation amount Mb of the bias in FIG. 6B is determined. Further, the change amount $\Delta B$ in the B axis at the determined formation amount of the bias Mb in FIG. 6B is set as the correction amount $\Delta Ba$ in the B axis.

Next, the correction amount determination unit 24 calculates the correction amount $\Delta Cwa$ in the Cw axis (step S15). For example, the correction amount determination unit 24 calculates the correction amount $\Delta Cwa$ in the Cw axis based on the target modification amount of the helix angle, the change amount $\Delta Cw$ in the Cw axis, the formation amount Mh of the helix angle Mh (a lower diagram of FIG. 6C), the formation amount Mh of the helix angle at the correction amount $\Delta Ya$ in the Y axis (a lower diagram of FIG. 6A) and the formation amount Mh of the helix angle at the correction amount $\Delta Ba$ in the B axis (a lower diagram of FIG. 6B). For example, in a case where the sum of the formation amount Mh of the helix angle at the correction amount $\Delta Ya$ in the Y axis (the lower diagram of FIG. 6A), the formation amount Mh of the helix angle at the correction amount $\Delta Ba$ in the B axis (the lower diagram of FIG. 6B) and the formation amount Mh of the helix angle in FIG. 6C match the target modification amount, the formation amount Mh of the helix angle in FIG. 6C is determined. Further, the change amount $\Delta Cw$ in the Cw axis at the determined formation amount Mh of the helix angle in FIG. 6C is set as the correction amount $\Delta Cwa$ in the $C_w$ axis.

Next, the correction amount determination unit 24 calculates modification amounts Mc', Mb', and Mh' of the crowning, the bias, and the helix angle (step S16). The modification amounts Mc', Mb', and Mh' of the modification elements are calculated based on the correction amount $\Delta Ya$ in the Y axis, the correction amount $\Delta Ba$ in the B axis, the correction amount $\Delta Cw$ in the $C_w$ axis, and the correlations. For example, the modification amount Mc' of the crowning is calculated by a total value of the formation amount Mc of the crowning at the correction amount $\Delta Ya$ in the Y axis (the upper diagram of FIG. 6A), the formation amount Mc of the crowning at the correction amount $\Delta Ba$ in the B axis (the upper diagram of FIG. 6B), and the formation amount Mc of the crowning at the correction amount $\Delta Cwa$ in the Cw axis (the upper diagram of FIG. 6C). The same applies to the modification amounts Mb', Mh' of the bias and helix angle.

Next, the correction amount determination unit 24 determines whether or not the modification amounts Mc', Mb', and Mh' of the crowning, the bias, and the helix angle approximate to the respective target modification amounts (step S17). The correction amount determination unit 24 returns to step S13 and repeats the above process if the respective modification amounts Mc', Mb', and Mh' approximate to the respective target modification amounts (S17: No). For example, if the modification amount Mc' of the crowning is deviated from the target modification amount, the correction amounts $\Delta Ya$, $\Delta Ba$, and $\Delta Cwa$ of the respective modification elements are calculated so that an amount of deviation can be additionally modified.

As described above, the correction amount determination unit 24 calculates the correction amount $\Delta Ya$ in the Y axis, the correction amount $\Delta Ba$ in the B axis, and the correction amount $\Delta Cwa$ in the Cw axis in this order. As shown in FIGS. 6A to 6C, a reason for this is that changes in the formation amounts Mc, Mb, and Mh of the modification elements are smaller in the order of the Y axis, the B axis, and the Cw axis. That is, the B axis is less affected by the Y axis, and the Cw axis is less affected by the Y axis and the B axis. From this relationship, the modification amounts Mc', Mb', and Mh' of the respective modification elements reaches the respective target modification amounts early by a simple calculation. That is, in the determination of the correction amounts $\Delta Ya$, $\Delta Ba$, and $\Delta C_wa$ in the Y axis, the B axis, and the Cw axis, the number of times of repetitions of steps S13 to S17 can be reduced.

The correction amount determination unit 24 determines the calculated correction amounts $\Delta Ya$, $\Delta Ba$, and $\Delta Cwa$ in the Y axis, the B axis, and the $C_w$ axis that are the machining control elements (step S18), if the modification amounts Mc', Mb', and Mh' approximate to the respective target modification amounts in step S17 (S17: Yes). Therefore, the correction amounts $\Delta Ya$, $\Delta Ba$, and $\Delta Cwa$ of the respective modification elements can be calculated by a very simple calculation. The simple calculation referred to here means a simpler calculation than the calculation by the gear machining simulation.

Next, the tooth surface shape calculation unit 25 calculates the tooth surface shape of the gear by the gear machining simulation using the correction amounts $\Delta Ya$, $\Delta Ba$, and $\Delta Cwa$ in the Y axis, the B axis, and the Cw axis, which are the machining control elements, determined by the correction amount determination unit 24 (step S19). Further, the shape error calculation unit 26 compares the tooth surface shape calculated by the tooth surface shape calculation unit 25 with the target modification amount stored in the target modification amount storage unit 23 and calculates the errors of the crowning, the bias, and the helix angle (step S20).

The shape error calculation unit 26 determines whether or not the calculated errors of the crowning, the bias, and the helix angle are within tolerance values (step S21). Further, if the errors of the crowning, the bias, and the helix angle are out of the respective tolerance values, the process returns to step S13 to repeat the above process, and newly determined correction amounts ΔYa, ΔBa, and ΔCwa in the Y axis, the B axis, and the Cw axis are changed to the previously determined correction amounts ΔYa, ΔBa, and ΔCwa in the Y axis, the B axis, and the Cw axis.

On the other hand, if the errors of the crowning, the bias, and the helix angle are within the respective tolerance values, the correction amount determination unit 24 transmits the correction amounts ΔYa, ΔBa, and ΔCwa in the Y axis, the B axis, and the Cw axis determined in step S18 to the machining control unit 13 (step S22), and all the processes ends.

The machining control unit 13 controls the machining of the tooth of the gear based on the correction amounts ΔYa, ΔBa, and ΔCwa in the Y axis, the B axis, and the Cw axis, which are the machining control elements, determined by the correction amount determination unit 24. That is, the center axis line $R_T$ of the machining tool T is set at an angle with respect to an axis line parallel to the center axis line $R_W$ of the workpiece W. Further, while synchronizing the rotation of the workpiece W around the center axis line $R_W$ of the workpiece W and the rotation of the machining tool T around the center axis line $R_T$ of the machining tool T, the machining tool T is moved to the workpiece W in the center axis line $R_W$ direction of the workpiece W, and a curved inclination or a linear inclination shown in FIGS. 5A to 5C with respect to the target modification amount is changed to control the operation in the Y axis, the B axis, and the Cw axis, whereby the tooth of the gear are machined on the workpiece W.

As described above, in the gear machining that has received the gear machining support, machining time of the tooth of the gear having the modified tooth surface shape can be shortened by machining the tooth of the gear on the workpiece W based on the determined correction amounts ΔYa, ΔBa, and ΔCwa in the Y axis, the B axis, and the Cw axis, which are the machining control elements.

The correlation calculation unit for the correlation between the modification element and the machining control element calculates the correlation by machine learning such as a neural network, and machining can be performed with high accuracy even if the machining control element is changed with respect to the modification element.

(8. Configuration of Gear Machining Support Device 30 According to Another Embodiment)

In the gear machining support device 20 described above, in order to correct the intersection angle θ according to the tooth width position of the tooth of the gear to be machined on the workpiece W, the simulation is performed on the premise that the machining tool T is rotated about the axis line of the axis parallel to the Y axis. However, in the gear machining device 10 according to the present embodiment, since the workpiece W is rotated around the axis parallel to the Y axis in the B axis direction to correct the intersection angle θ, the machining point is deviated from the center axis line $R_W$ of the workpiece W during the machining of the workpiece W by the machining tool T, resulting in a machining error.

Therefore, it is necessary to specify a relationship between operations in an axis (the B axis) for creating the intersection angle θ, the X axis and the Z axis so that the machining point always moves on the center axis line $R_W$ of the workpiece W. Here, a behavior of the machining point will be described with reference to the drawings. As indicated by a dash-dot line in FIG. 11A, in a state in which the intersection angle θ is 0° (a state in which the center axis line $R_W$ of the workpiece W coincides with the center axis line $R_T$ of the machining tool T), X, Z coordinate values ($X_w$, $Z_w$) of a center point $P_w$ of an end surface of the workpiece W on a machining tool T side is obtained.

The sum of a distance β between a center point $O_B$ on the center axis line RB of the B axis and the center point $P_w$ of the end surface of the workpiece W and a run-up amount (also referred to as a margin amount) α of the machining tool T determined by a machining condition is set as a machining point distance L and obtained from the following formula (1). Incidentally, the run-up amount is a distance between the center point $P_w$ of the end surface of the workpiece W and a center point $P_0$ (the machining point) of an end surface of the machining tool T on a workpiece W side positioned at a machining start position.

Formula (1)

$$L=\beta+\alpha \tag{1}$$

Figure 11A:
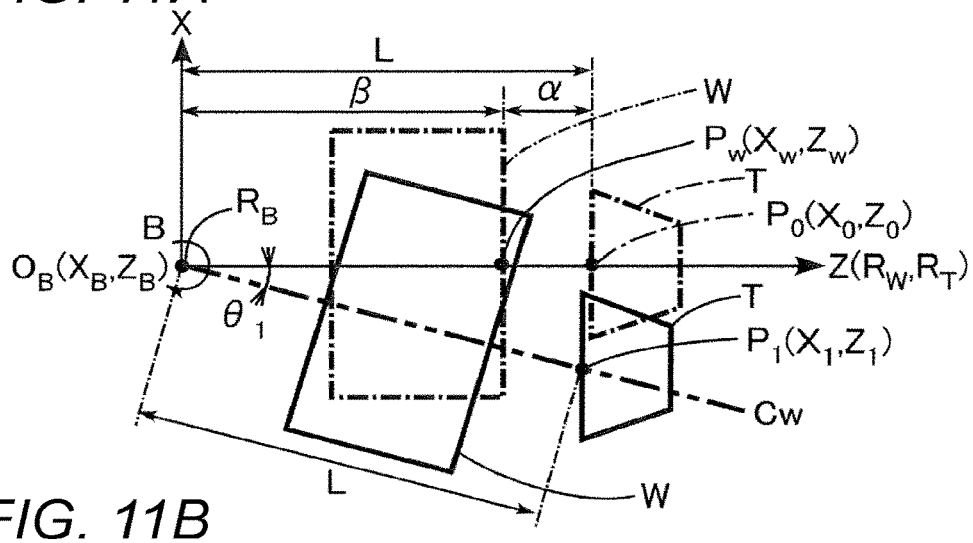
FIG. 11A is a view showing positions of the workpiece and the machining tool in a case where an intersection angle $\theta_1$ is created by the B axis.

Then, as indicated by a solid line in FIG. 11A, when the B axis is rotated at an intersection angle $\theta_1$, which is determined by the machining condition, at the start of the machining, the machining point moves from $P_0$ to $P_1$. Accordingly, an X coordinate value $X_1$ and a Z coordinate value $Z_1$ of the machining point $P_1$ are expressed by the following formulas (2) and (3).

Formula (2)

$$X_1 = X_W + L \sin \theta_1 \tag{2}$$

Formula (3)

$$Z_1 = Z_W + L \cos \theta_1 \tag{3}$$

Figure 11B:
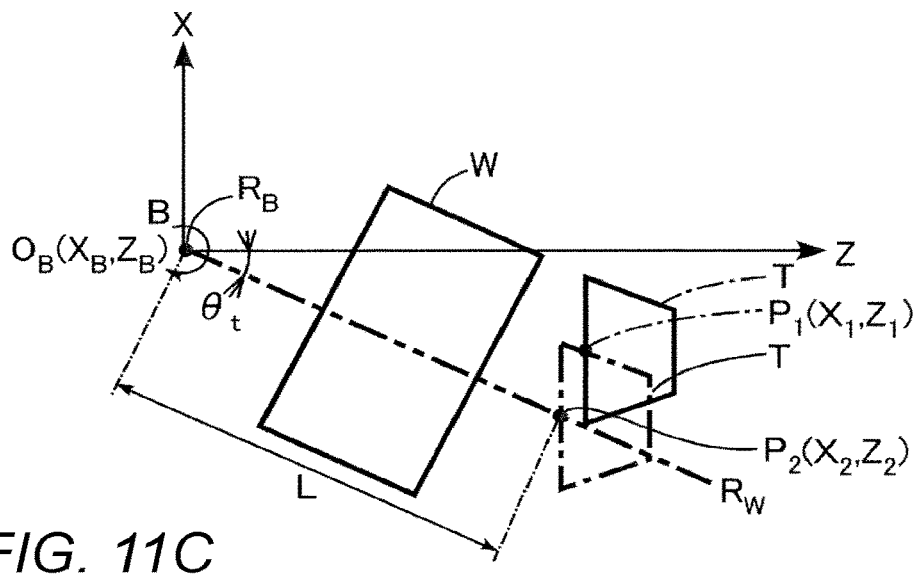
FIG. 11B is a view showing positions of the workpiece and the machining tool in a case where an intersection angle formed by the B axis is $\theta_r$.

As indicated by a solid line in FIG. 11B, if the machining tool T is stopped even if the B axis is rotated, when the B axis rotates due to the start of the machining and the intersection angle varies from $\theta_1$ to $\theta_t$, the machining point $P_1$ is deviated from the center axis line $R_W$ of the workpiece W unless it moves to a position $P_2$. In order to eliminate this deviation, it is necessary to move the machining tool T along with the rotation of the B axis.

Figure 11C:
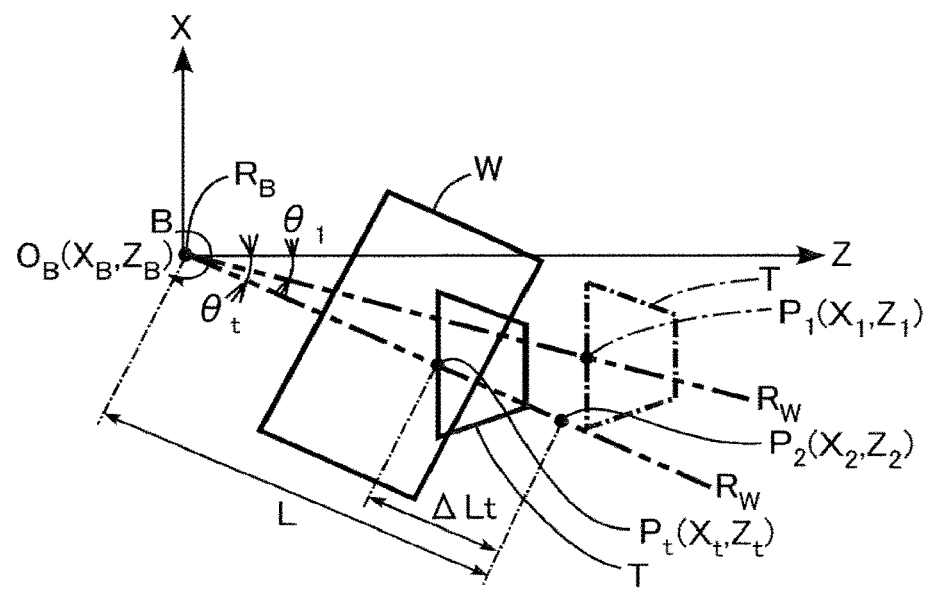
FIG. 11C is a view showing positions of the workpiece and the machining tool when moved to $P_t$ separated by $\Delta Lt$ from a machining start.

Therefore, as shown in FIG. 11C, when the B axis is rotated by the start of the machining and the intersection angle is varied from $\theta_1$ to $\theta_t$, it is assumed that the machining point $P_2$ is moved to $P_t$ separated by $\Delta L t$ from the center axis line $R_W$ of the workpiece W. The machining point position at this time, that is, an X coordinate value $X_t$ and a Z coordinate value $Z_t$ of the machining point $P_t$ are expressed by the following formulas (4) and (5). Incidentally, the intersection angle $\theta_t$ is expressed by the following formula (6). A in formula (6) is a coefficient.

Formula (4)

$$X_t = (L - \Delta Lt) \sin \theta t \tag{4}$$

Formula (5)

$$Z_t = (L - \Delta Lt) \cos \theta t \tag{5}$$

Formula (6)

$$\theta_t = A\Delta Lt \tag{6}$$

Figure 12A:
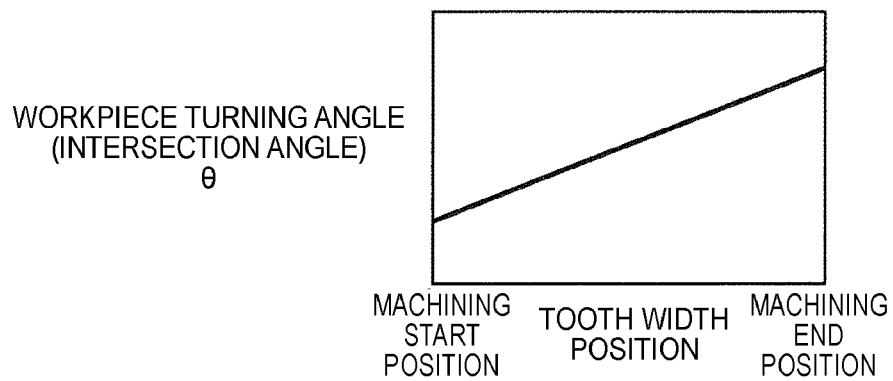
FIG. 12A is a view showing a relationship between a tooth width and a workpiece turning angle.
Figure 12B:
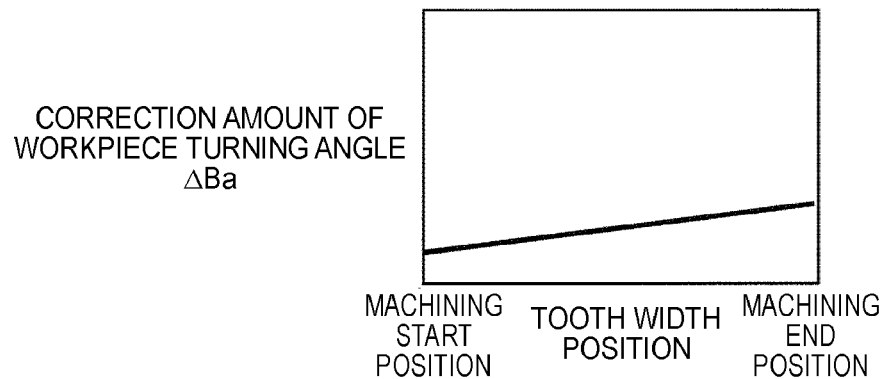
FIG. 12B is a view showing a relationship between a tooth width position and a correction amount of the workpiece turning angle.

As shown in FIG. 12A (the same as FIG. 5B), the bias can be formed by linearly changing the intersection angle θ between the center axis line $R_T$ of the machining tool T and the center axis line $R_W$ of the workpiece W in the tooth width direction. Therefore, the bias can be modified by controlling the operation (the workpiece turning angle (the intersection angle θ)) in the B axis that is the rotation axis of the workpiece W. Here, as shown in FIG. 12B, the correction amount in the B axis (a correction amount of the workpiece turning angle) ΔBa changes linearly in the tooth width direction.

Figure 12C:
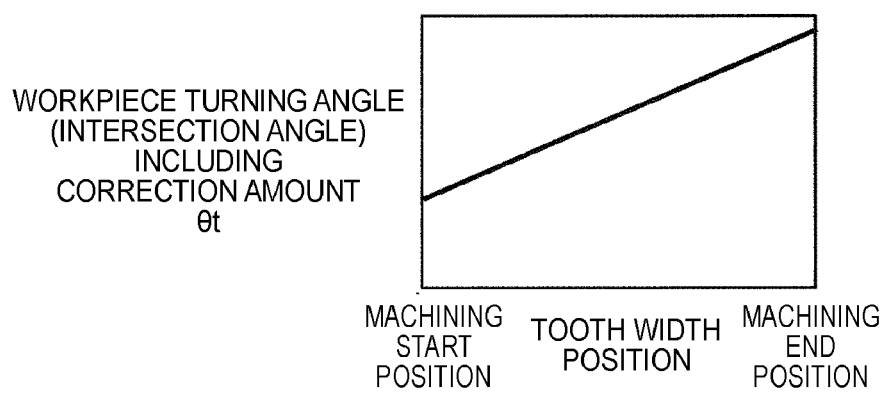
FIG. 12C is a view showing a relationship between the tooth width position and the workpiece turning angle including the correction amount.
Figure 12D:
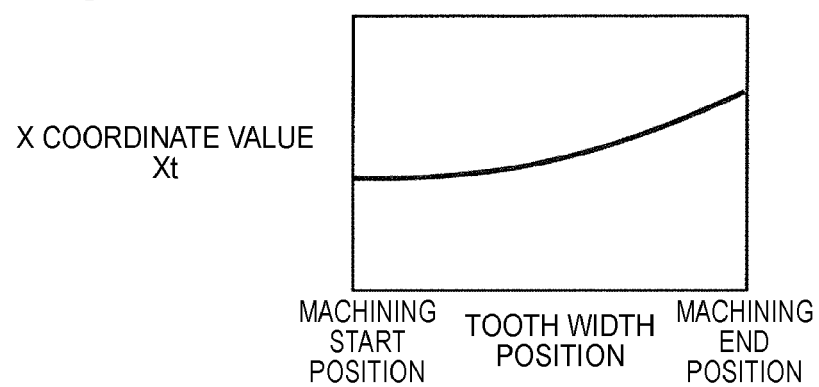
FIG. 12D shows a relationship between the tooth width position and an X coordinate value.
Figure 12E:
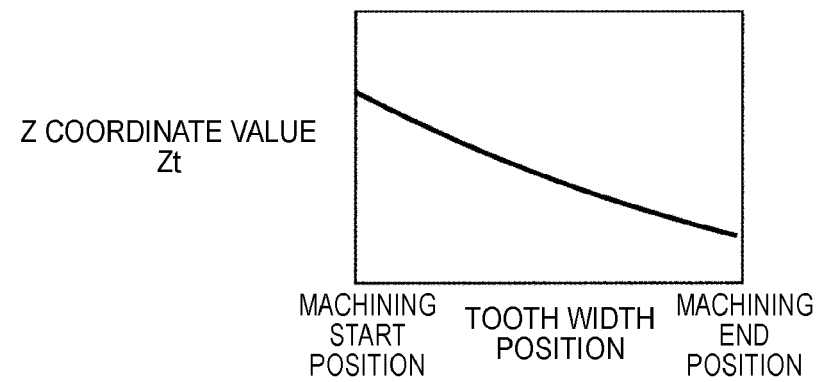
FIG. 12E shows a relationship between the tooth width position and a Z coordinate value.

As shown in FIG. 12C, an angle in the B axis including the correction amount ΔBa (the workpiece turning angle (the intersection angle $θ_t$)) linearly changes with a positive inclination as a tooth width position of the machining point $P_t$ moves from the machining start position to the machining end position. At this time, as shown in FIG. 12D, the machining point position, that is, the X coordinate value $X_t$ of the machining point $P_t$ changes in an upward sloping curve, and as shown in FIG. 12E, the Z axis position $Z_t$ of the machining point $P_t$ changes in a downward sloping curve.

As described above, by controlling a movement in the X axis and the Z axis in accordance with a rotation control of the B axis, the machining point $P_t$ can be suppressed from deviating from the center axis line $R_W$ of the workpiece W. That is, by applying a point group obtained by formulas (4) and (5) to a NC program and machining the tooth on the workpiece W by the machining tool T, the machining point $P_t$ during the machining can move on the center axis line $R_W$ of the workpiece W and can match the tooth surface obtained by the simulation.

Figure 13:
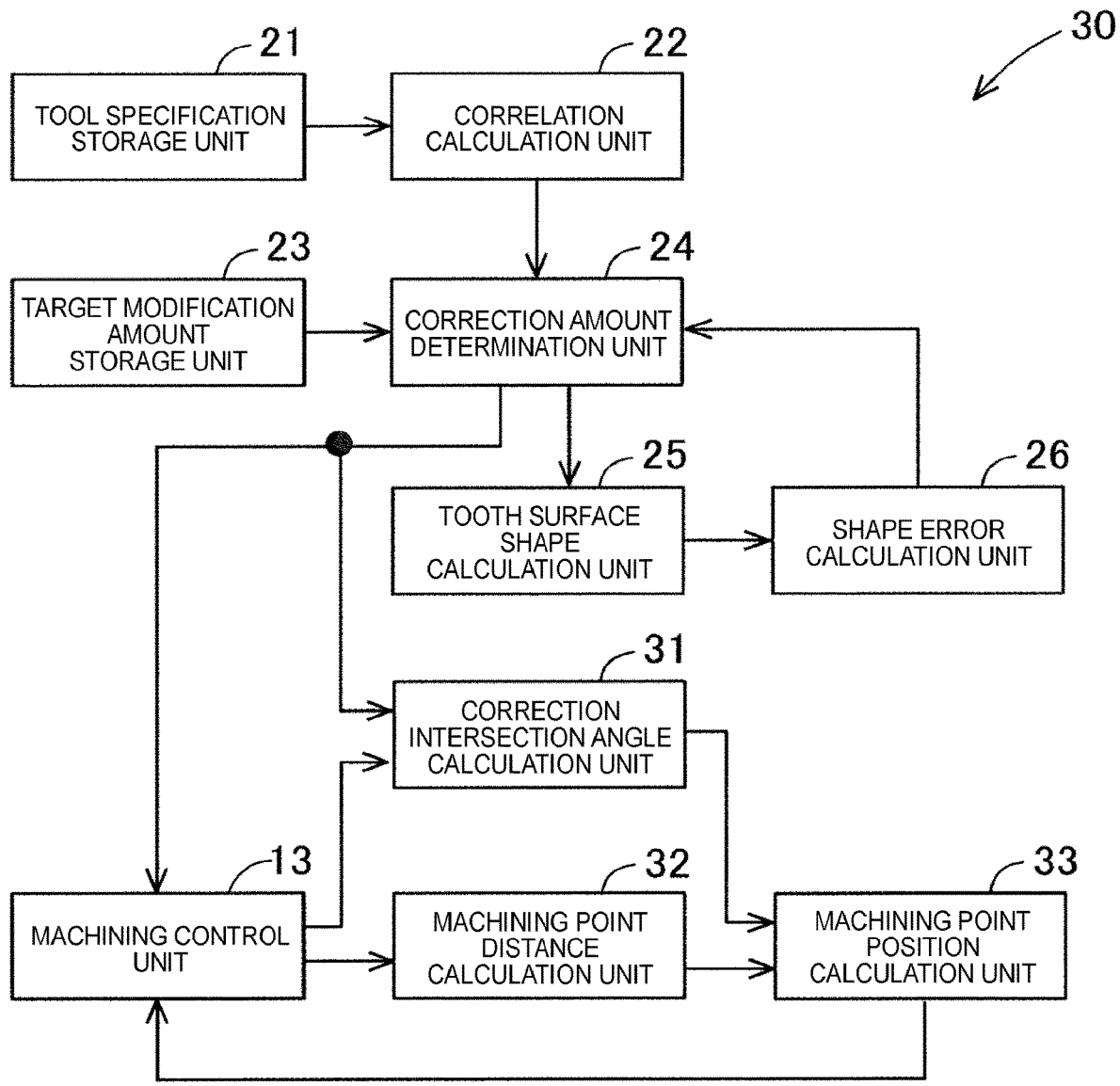
FIG. 13 is a view showing a configuration of a gear machining support device according to another embodiment.
Figure 14A:
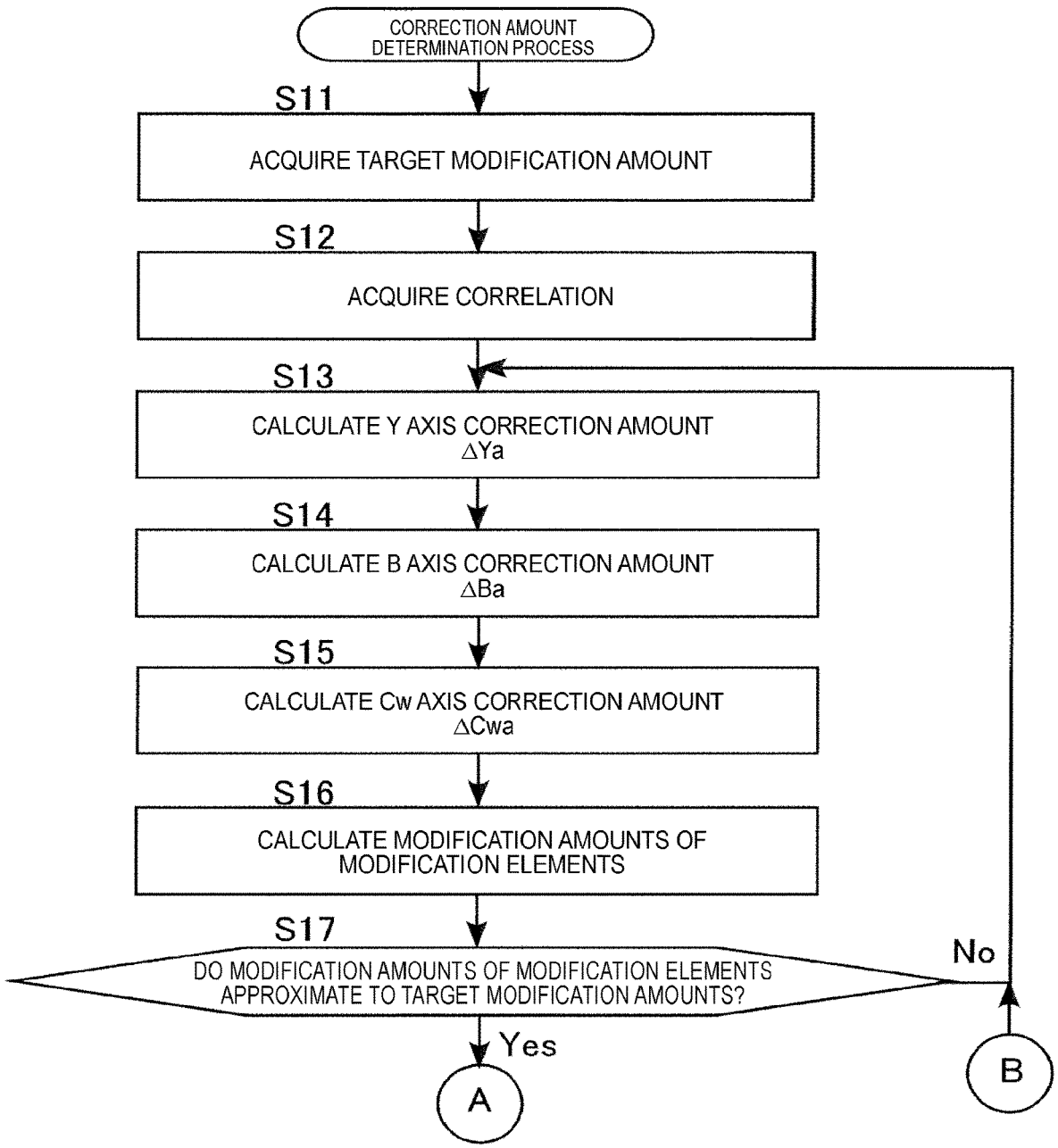
FIG. 14A is a flowchart showing a correction amount determination process by the gear machining support device according to the embodiment.
Figure 14B:
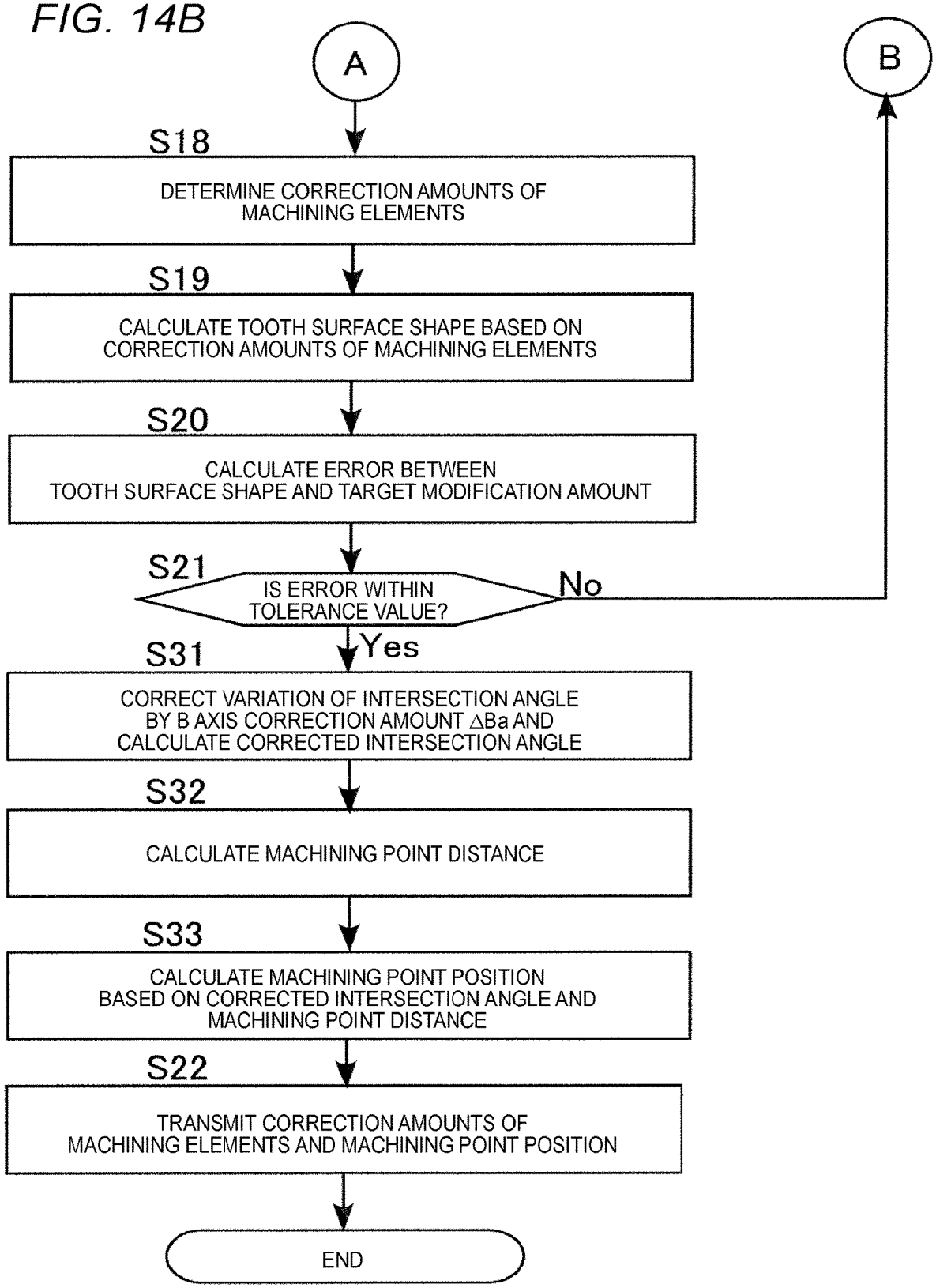
FIG. 14B is a flowchart showing the correction amount determination process by the gear machining support device according to the embodiment.

Next, a configuration of the gear machining support device 30 according to another embodiment will be described with reference to FIGS. 13, 14A, and 14B shown corresponding to FIGS. 8 and 10. In FIGS. 13, 14A, and 14B, the same components and steps as those shown in FIGS. 8 and 10 are denoted by the same reference numerals and the same symbols, and a detailed description thereof will be omitted. In addition, the steps shown in FIG. 9 are also the same steps for the gear machining support device 30, and therefore are not shown.

As shown in FIG. 13, the gear machining support device 30 according to the present embodiment has a configuration in which a correction intersection angle calculation unit 31, a machining point distance calculation unit 32, and a machining point position calculation unit 33 are newly added to the configuration of the gear machining support device 20 shown in FIG. 8. The correction intersection angle calculation unit 31 reads the correction amount ΔBa in the B axis from the correction amount determination unit 24. Further, the variation (see FIG. 5B) of the intersection angle θ, which is determined by the machining condition, read from the machining control unit 13 is corrected by the correction amount ΔBa in the B axis to obtain a corrected intersection angle $θ_t$ (see FIG. 12C).

The machining point distance calculation unit 32 calculates the sum of the distance β between the center point $O_B$ of the B axis and the center point $P_W$ of the end surface of the workpiece W and the run-up amount (the margin amount) α, which is determined by the machining condition, read from the machining control unit 13 as the machining point distance L (see FIG. 11A). Specifically, the calculation is performed using formula (1).

The machining point position calculation unit 33 calculates the machining point position using the corrected intersection angle $θ_t$ read from the correction intersection angle calculation unit 31 and the machining point distance L read from the machining point distance calculation unit 32. That is, when the B axis is rotated by the start of the machining, the intersection angle is varied from $θ_1$ to $θ_t$, and the machining point $P_2$ is moved to $P_t$ separated by ΔLt from the center axis line $R_W$ of the workpiece W, the X coordinate value $X_t$ and the Z coordinate value $Z_t$ of the machining point $P_t$ is calculated as the machining point position (see FIG. 11C). Specifically, the calculation is performed using formulas (4), (5) and (6).

Figure 10:
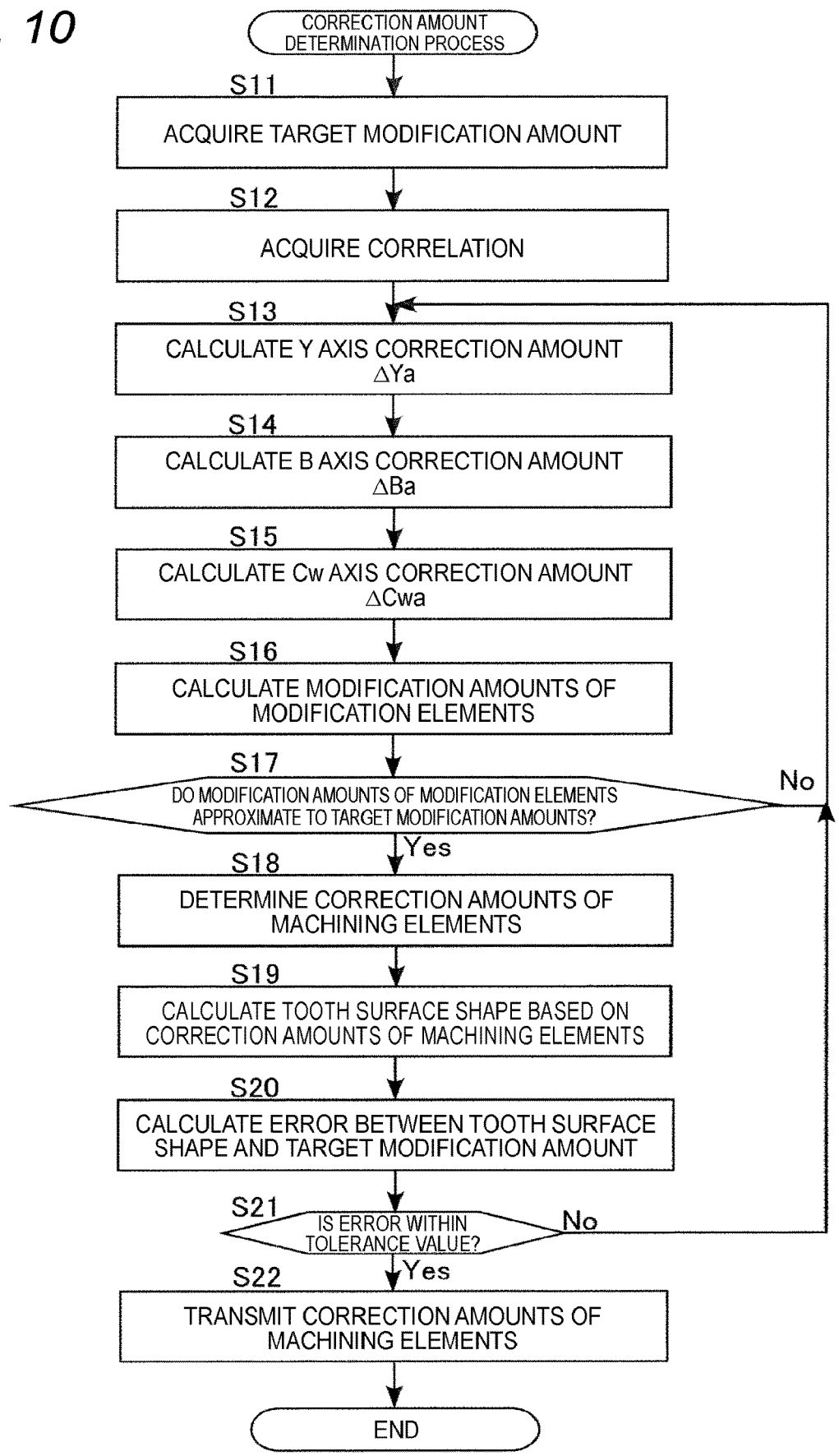
FIG. 10 is a flowchart showing a correction amount determination process by the gear machining support device.

The correction amount determination process of the modification element performed by the correction amount determination unit 24, the tooth surface shape calculation unit 25, and the shape error calculation unit 26 in the gear machining support device 30 in FIGS. 14A and 14B is the same as steps S11 to S21 of FIG. 10, and a detailed description thereof is omitted. In step S21, if errors of the crowning, the bias, and the helix angle are within the respective tolerance values, the correction intersection angle calculation unit 31 corrects the variation of the intersection angle θ by the correction amount ΔBa in the B axis and calculate the corrected intersection angle θt (step S31).

The machining point distance calculation unit 32 calculates the machining point distance L, which is the sum of the distance β between the center point $O_B$ of the B axis and the center point $P_W$ of the end surface of the workpiece W and the run-up amount (the margin amount) α (step S32). The machining point position calculation unit 33 calculates the machining point position ($X_t$, $Z_t$) of the machining point $P_t$ if the intersection angle is varied from $θ_1$ to $θ_t$ (step S33). Further, the correction amount determination unit 24 transmits the correction amounts ΔYa, ΔBa, and ΔCwa in the Y axis, the B axis, and the Cw axis determined in step S18 and the machining point position ($X_t$, $Z_t$) of the machining point $P_t$ if the intersection angle is varied from $θ_1$ to $θ_t$ determined in step S33 to the machining control unit 13 (step S22), and all the processes ends.

Although the relationship between the operations in the B axis as the axis for creating the intersection angle θ, the X axis and the Z axis is specified in the above embodiment, a relationship between operations in an A axis as the axis for creating the intersection angle θ, the X axis, and the Y axis or a relationship between operations in the Y axis, the X axis, and the Z axis can also be specified by similarly defining ΔLt. That is, a Y axis coordinate value $Y_t$ of the machining point $P_t$ is expressed by the following formula (7), and an A axis coordinate value $A_t$ is expressed by the following formula (8). Incidentally, values D, F in formulas (7) and (8) are coefficients.

Formula (7)

$$Y_t = D\Delta Lt^2 + \Delta Lt \tag{7}$$

Formula (8)

$$A_t = F\Delta Lt \tag{8}$$

The invention claimed is:

1. A gear machining support device that supports machining when a tooth of a gear is machined on a workpiece by relatively moving the workpiece and a machining tool while synchronizing a rotation of the workpiece around a center axis line of the workpiece and a rotation of the machining tool around a center axis line of the machining tool, the gear machining support device comprising: a processor; and a memory storing instructions that, when executed by the processor, cause the gear machining support device to perform operations comprising: obtaining target modification amounts of at least two modification elements of a tooth surface shape of the tooth of the gear, the modification elements comprising crowning, bias, a helix angle, a pressure angle, and a tooth profile roundness;

calculating a correlation between each of the modification elements of the tooth surface shape of the tooth of the gear and machining control elements based on a tooth surface shape of the gear obtained in response to changing only one of the machining control elements for each of the machining control elements, the machining control elements including a distance between centers of the center axis line of the machining tool and the center axis line of the workpiece, an intersection angle formed between the center axis line of the machining tool and the center axis line of the workpiece, an offset angle obtained when a machining point of the machining tool and the workpiece is deviated in a circumferential direction of the workpiece, and a rotation angle of the workpiece with respect to a rotation angle of the machining tool; and determining, based on the correlation, a correction amount of at least one of the machining control elements during a machining operation such that the at least two of modification elements approximate the respective target modification amounts.

2. The gear machining support device according to claim 1, wherein the operations further comprise:

calculating a tooth surface shape of the gear using the correction amount of the machining control element; and calculating an error by comparing the tooth surface shape with the target modification amounts, wherein the correction amount of the machining control element is changed and determined in a case in which the error is out of a tolerance value.

3. The gear machining support device according to claim 1, wherein correction amounts of at least two of the machining control elements are determined.

4. The gear machining support device according to claim 1, wherein in a case where the tooth of the gear is machined on the workpiece by moving a machining point of the machining tool and the workpiece toward an axis for creating an intersection angle formed by the center axis line of the machining tool and the center axis line of the workpiece, the operations further comprise:

calculating a distance between a center axis line of the axis for creating the intersection angle and the machining point; and calculating a position of the machining point during the machining operation based on the calculated distance.

5. The gear machining support device according to claim 4, wherein the calculating the position of the machining point comprises calculating a relative movement position of the machining tool and the workpiece as one of the machining control elements in accordance with a corrected intersection angle comprising a correction amount of the intersection angle as one of the machining control elements, such that the machining point is positioned on the center axis line of the workpiece.

6. The gear machining support device according to claim 1, wherein the correction amount of the at least one of the machining control elements is determined based on a modification amount of the crowning.

7. The gear machining support device according to claim 6, wherein the correction amount of the at least one of the machining control elements is determined based on a modification amount of the bias.

8. The gear machining support device according to claim 7, wherein the correction amount of the at least one of the machining control elements is determined based on the helix angle.

9. A gear machining device comprising:

the gear machining support device according to claim 1; and a controller, wherein machining of the tooth of the gear is controlled by the controller based on the correction amount of the at least one of the machining control elements determined by the gear machining support device.

10. A gear machining support device that supports machining when a tooth of a gear is machined on a workpiece by relatively moving the workpiece and a machining tool while synchronizing a rotation of the workpiece around a center axis line of the workpiece and a rotation of the machining tool around a center axis line of the machining tool, the gear machining support device comprising: a processor; and a memory storing instructions that, when executed by the processor, cause the gear machining support device to perform operations comprising: obtaining target modification amounts of at least two modification elements of a tooth surface shape of the tooth of the gear, the modification elements comprising crowning, bias, a helix angle, a pressure angle, and a tooth profile roundness; and determining a correction amount of at least one of machining control elements during a machining operation such that the at least two of modification elements approximate the respective target modification amounts, wherein in a case where the tooth of the gear is machined on the workpiece by moving a machining point of the machining tool and the workpiece toward an axis for creating an intersection angle formed by the center axis line of the machining tool and the center axis line of the workpiece, the operations further comprise:

calculating a distance between a center axis line of the axis for creating the intersection angle and the machining point; and calculating a position of the machining point during the machining operation based on the calculated distance.

11. The gear machining support device according to claim 10, wherein the calculating the position of the machining point comprises calculating a relative movement position of the machining tool and the workpiece as one of the machining control elements in accordance with a corrected intersection angle comprising a correction amount of the intersection angle as one of the machining control elements, such that the machining point is positioned on the center axis line of the workpiece.

\* \* \* \* \*